US012439535B2

(12) United States Patent
Kang et al.

(10) Patent No.: US 12,439,535 B2
(45) Date of Patent: Oct. 7, 2025

(54) ELECTRONIC DEVICE INCLUDING ELASTIC MEMBER

(71) Applicant: SAMSUNG ELECTRONICS CO., LTD., Suwon-si (KR)

(72) Inventors: Hyunggwang Kang, Suwon-si (KR); Myunghoon Kwak, Suwon-si (KR); Junhyuk Kim, Suwon-si (KR); Soyoung Lee, Suwon-si (KR); Jookwan Lee, Suwon-si (KR); Hoyoung Jeon, Suwon-si (KR); Hojin Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 370 days.

(21) Appl. No.: 18/088,104

(22) Filed: Dec. 23, 2022

(65) Prior Publication Data

US 2023/0209748 A1 Jun. 29, 2023

Related U.S. Application Data

(63) Continuation of application No. PCT/KR2022/020989, filed on Dec. 21, 2022.

(30) Foreign Application Priority Data

Dec. 24, 2021 (KR) .................. 10-2021-0187748
Feb. 3, 2022 (KR) .................. 10-2022-0014379

(51) Int. Cl.
*H05K 5/02* (2006.01)
*H05K 5/00* (2006.01)

(52) U.S. Cl.
CPC ......... *H05K 5/0217* (2013.01); *H05K 5/0086* (2013.01)

(58) Field of Classification Search
CPC ................. H05K 5/0017; H05K 5/0217
(Continued)

(56) References Cited

U.S. PATENT DOCUMENTS

| 10,976,775 B1 | 4/2021 | Cha |
| 2017/0357287 A1 | 12/2017 | Yang |

(Continued)

FOREIGN PATENT DOCUMENTS

| CN | 111587016 | 8/2020 |
| CN | 113194180 | 7/2021 |

(Continued)

OTHER PUBLICATIONS

Search Report and Written Opinion dated Mar. 30, 2023 issued in International Patent Application No. PCT/KR2022/020989.

(Continued)

*Primary Examiner* — Hung S. Bui
(74) *Attorney, Agent, or Firm* — Nixon & Vanderhye P.C.

(57) ABSTRACT

According to various embodiments of the disclosure, an electronic device may include: a housing including a first housing and a second housing configured to guide sliding movement of the first housing, a display configured to be at least partially unfolded based on the sliding movement of the first housing, and including a first display area disposed on the first housing and a second display area extending from the first display area, a battery disposed in the first housing, a driver configured to provide a driving force for the sliding movement to the first housing, and including a motor disposed in the first housing and a gear structure including a gear at least partially disposed in the second housing and connected to the motor, and an elastic member comprising a material arranged to be compressible and to provide an elastic restoring force disposed in the second housing. The gear structure may be disposed adjacent to one (Continued)

end of the battery, and the elastic member may be disposed adjacent to the other end of the battery facing a direction opposite to the one end of the battery.

20 Claims, 19 Drawing Sheets

(58) Field of Classification Search
USPC .......................................... 361/807, 809, 810
See application file for complete search history.

(56) References Cited

U.S. PATENT DOCUMENTS

| | | | |
|---|---|---|---|
| 2020/0267247 A1* | 8/2020 | Song | H04M 1/0237 |
| 2021/0195009 A1 | 6/2021 | Choi et al. | |
| 2021/0223820 A1* | 7/2021 | Yoo | G06F 1/1681 |
| 2022/0279058 A1 | 9/2022 | Song et al. | |
| 2022/0303373 A1 | 9/2022 | Kang et al. | |
| 2022/0337688 A1 | 10/2022 | Sang et al. | |
| 2023/0096954 A1 | 3/2023 | An et al. | |

FOREIGN PATENT DOCUMENTS

| | | |
|---|---|---|
| CN | 214480722 | 10/2021 |
| KR | 10-1474415 | 3/2009 |
| KR | 10-1888800 | 8/2017 |
| WO | 2021/025197 | 2/2021 |
| WO | 2021/025198 | 2/2021 |
| WO | 2021/045262 | 3/2021 |
| WO | 2021/125391 | 6/2021 |

OTHER PUBLICATIONS

Extended European Search Report dated Oct. 4, 2024 issued in European Patent Application No. 22911943.3.

* cited by examiner

ELECTRONIC DEVICE INCLUDING ELASTIC MEMBER

CROSS-REFERENCE TO RELATED APPLICATIONS

This application is a continuation of International Application No. PCT/KR2022/020989 designating the United States, filed on Dec. 21, 2022, in the Korean Intellectual Property Receiving Office and claiming priority to Korean Patent Application No. 10-2021-0187748, filed on Dec. 24, 2021, and to Korean Patent Application No. 10-2022-0014379, filed on Feb. 3, 2022, in the Korean Intellectual Property Office, the disclosures of all of which are incorporated by reference herein in their entireties.

BACKGROUND

Field

The disclosure relates to an electronic device, for example, an electronic device including an elastic member.

Description of Related Art

Due to the development of information and communication technology and semiconductor technology, various functions have been integrated into one portable electronic device. For example, an electronic device may implement not only a communication function but also an entertainment function such as a game, a multimedia function such as music/video playback, a communication and security function for mobile banking, schedule management, and an electronic wallet function. Such electronic devices are being miniaturized so that users may conveniently carry them.

As the mobile communication services extend to the multimedia service area, there is a need to increase the size of the display of the electronic device to allow a user to fully use multimedia services as well as voice calls or short messages. However, the size of the display of the electronic device is placed in a trade-off relationship with the miniaturization of the electronic device.

An electronic device (e.g., a mobile terminal) includes a display having a flat surface or both a flat surface and a curved surface. The electronic device including the display may have limitations in implementing a screen larger than the size of the electronic device due to a fixed display structure. Accordingly, an electronic device including a rollable display has been studied.

In an electronic device including a rollable display, rolling or sliding of the electronic device may be performed manually by a user's force, or automatically or semi-automatically by a driving force generated from a component (e.g., a motor) of the electronic device.

An electronic device including an automatic or semi-automatic rollable display may require a motor capable of providing a driving force equal to greater than a repulsive force (or frictional force) generated by the internal structure of the electronic device or the repulsive force (or frictional force) of the display, when the electronic device performs a sliding operation.

When performing the slide operation, the electronic device including the rollable display may need a higher driving force in a specific section than the other sections without requiring a driving force for sliding in every section. The electronic device requires a motor having an output higher than a maximum driving force available in the specific section. The resulting use of a high-power motor is not favorable in terms of cost and miniaturization of the electronic device.

SUMMARY

Embodiments of the disclosure provide an electronic device including an elastic member capable of reducing a maximum driving force that may be generated in a specific section, based on sliding movement of the electronic device.

However, the problems addressed in the disclosure are not limited to the above problem, and may be variously determined without departing from the spirit and scope of the disclosure.

According to various example embodiments of the disclosure, an electronic device may include: a housing including a first housing and a second housing accommodating at least part of the first housing and configured to guide sliding movement of the first housing, a display configured to be at least partially unfolded based on the sliding movement of the first housing, and including a first display area disposed on the first housing and a second display area extending from the first display area, a battery disposed in the first housing, a driver configured to provide a driving force for the sliding movement to the first housing, and including a motor disposed in the first housing and a gear structure including a gear at least partially disposed in the second housing and connected to the motor, and an elastic member comprising a material arranged to be compressible and to provide an elastic restoring force disposed in the second housing. The gear structure may be disposed adjacent to one end of the battery, and the elastic member may be disposed adjacent to the other end of the battery facing a direction opposite to the one end of the battery.

According to various example embodiments of the disclosure, an electronic device may include: a housing including a first housing and a second housing accommodating at least part of the first housing and configured to guide sliding movement of the first housing, wherein the first housing is configured to slidingly move in a first movement direction and a second movement direction opposite to the first movement direction, on the second housing, a display configured to be at least partially unfolded based on the sliding movement of the first housing, and including a first display area disposed on the first housing and a second display area extending from the first display area, a battery disposed in at least one of the first housing or the second housing, a driver configured to provide a driving force for the sliding movement to the first housing, and including a motor disposed in the first housing and a gear structure including a gear at least partially disposed in the second housing and connected to the motor, and a first elastic member comprising a material arranged to be compressible and to provide an elastic restoring force disposed in the second housing, and configured to be elastically deformed by the first housing, based on the first housing moving in the first movement direction, and to provide an elastic restoring force to the first housing in the second movement direction, based on the first housing moving in the second movement direction. The gear structure may be disposed adjacent to one end of the battery, and the first elastic member may be disposed adjacent to the other end of the battery facing a direction opposite to the one end of the battery.

According to various example embodiments of the disclosure, an electronic device may include: a first housing including a first side surface facing a first direction and a second side surface facing a second direction opposite to the first side surface, a second housing accommodating part of the first housing and configured to guide sliding movement of the first housing, a display configured to be at least partially unfolded based on the sliding movement of the first housing, and including a first display area disposed on the first housing and a second display area extending from the first display area, a driver configured to provide a driving force for the sliding movement to the first housing, and including a motor disposed in one of the first housing and the second housing, a pinion gear connected to the motor, and a rack gear disposed in the other of the first housing and the second housing and connected to the pinion gear, and an elastic member comprising a material arranged to be compressible and to provide an elastic restoring force disposed on at least one of the first housing or the second housing. The rack gear may be disposed between the first side surface of the first housing and the second side surface of first housing, and closer to the first side surface between the first side surface and the second side surface, and the elastic member may be disposed between the rack gear and the second side surface.

According to various example embodiments of the disclosure, an electronic device may receive an elastic restoring force from an elastic member, when a first housing slidingly moves. Since the elastic restoring force of the elastic member is provided as a force for the sliding movement of the first housing, a driving force of a motor required for opening or closing the electronic device may be reduced.

According to various example embodiments of the disclosure, the elastic member and a gear structure of a driver are disposed at symmetrical positions, thereby reducing tilting during the sliding movement of the first housing.

According to various example embodiments, since the elastic member is provided inside the electronic device, the elastic member may absorb an impact applied to the electronic device, and thus the durability and maintainability of the electronic device may be improved.

The effects that may be obtained by the disclosure are not limited to the above effects, and other unmentioned effects may be clearly understood by those skilled in the art from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
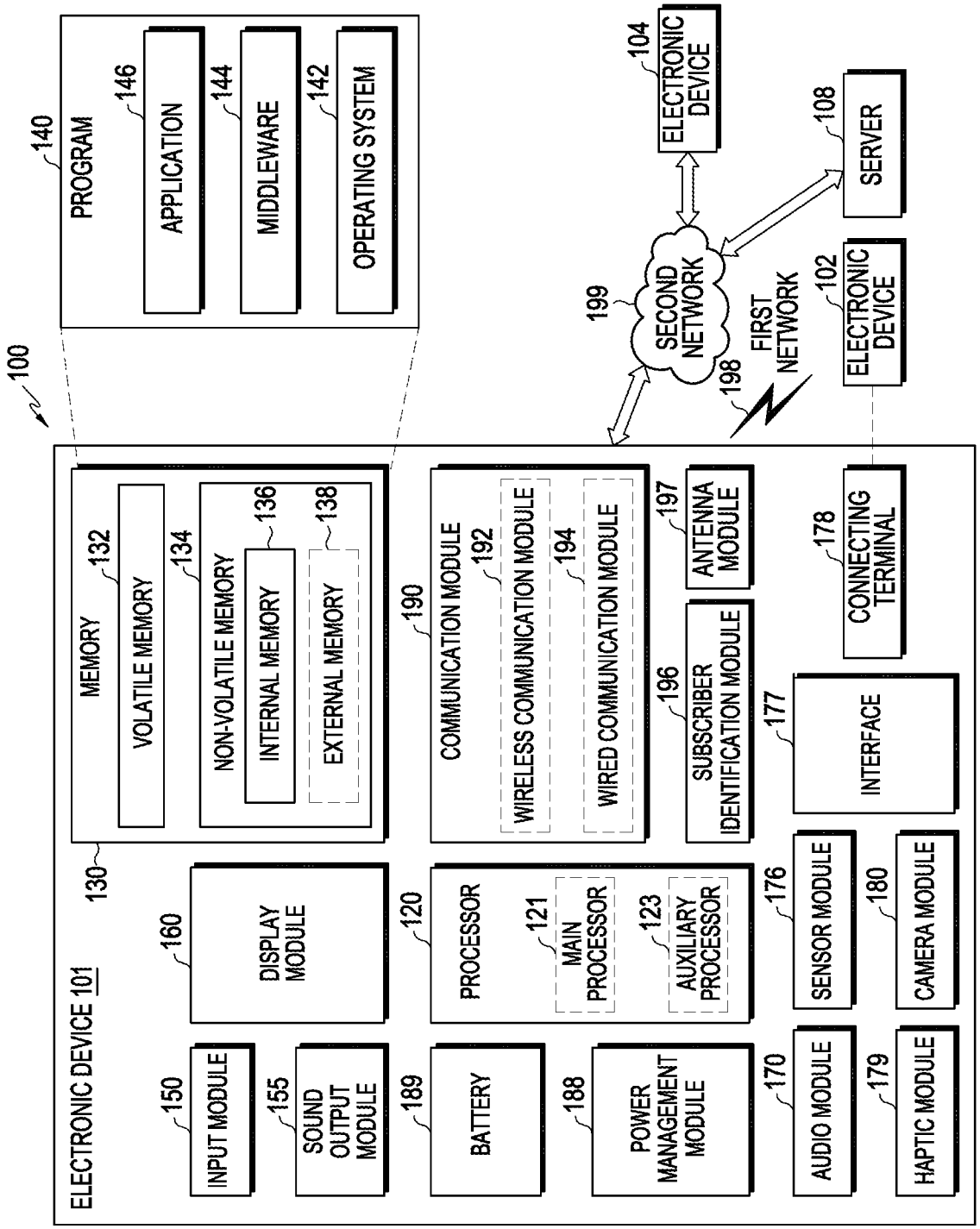
FIG. 1 is a block diagram illustrating an example electronic device in a network environment according to various embodiments.

FIG. 1 is a block diagram illustrating an example electronic device in a network environment according to various embodiments.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, antenna module 197 may include an antenna including a radiating element including a conductive material or a conductive pattern formed in or on a substrate (e.g., a printed circuit board (PCB)). According to an embodiment, antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "connected to", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
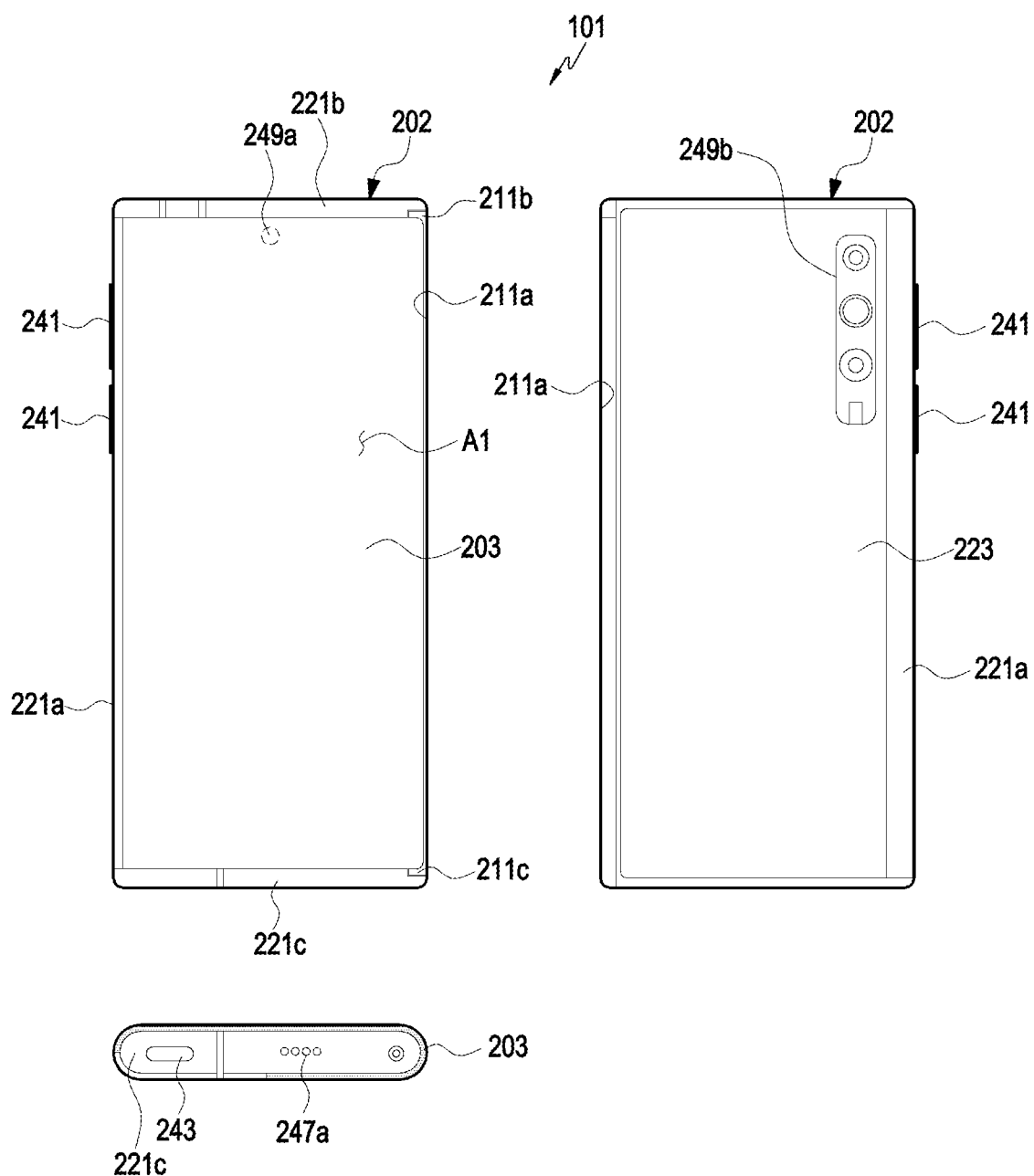
FIG. 2 is a diagram illustrating an electronic device in a closed state according to various embodiments.
Figure 3:
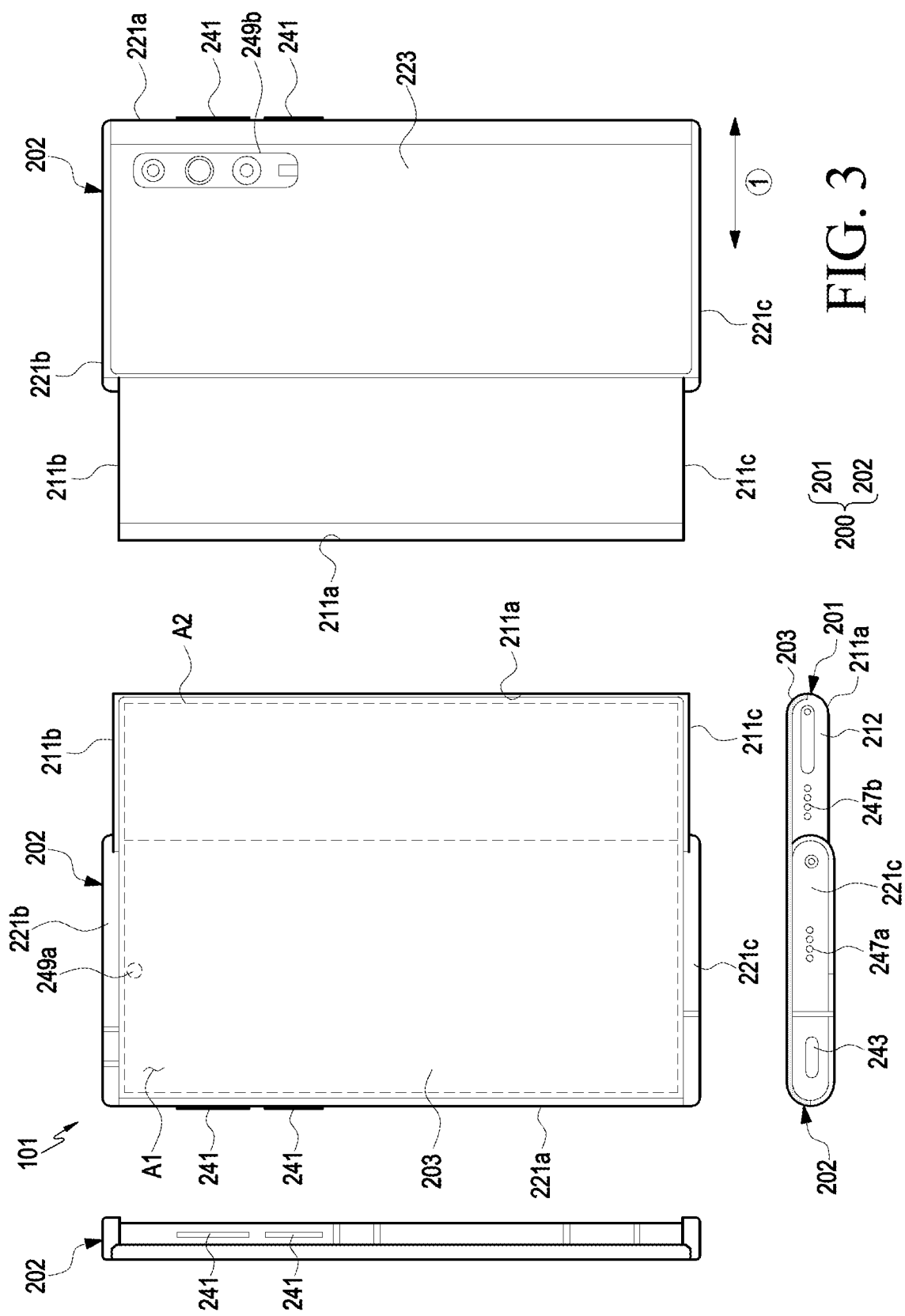
FIG. 3 is a diagram illustrating an electronic device in an open state according to various embodiments.

FIG. 2 is a diagram illustrating an electronic device in a closed state according to various embodiments. FIG. 3 is a diagram of an electronic device in an open state according to various embodiments. For example, FIG. 2 is a diagram illustrating a state in which a first display area A1 is accommodated in a second housing 202. FIG. 3 is a diagram illustrating a state in which at least part of the first display area A1 is visually exposed (e.g., visible; as used herein, the terms "visually exposed" and "visible" are used interchangeably) to the outside of the second housing 202.

The state illustrated in FIG. 2 may refer to a first housing 201 being closed with respect to the second housing 202, and the state illustrated in FIG. 3 may refer to the first housing 201 being open with respect to the second housing 202. According to various embodiments, the "closed state" or the "opened state" may be defined as a state in which the electronic device is closed or opened.

Referring to FIGS. 2 and 3, the electronic device 101 (e.g., the electronic device 101 of FIG. 1) may include a housing 200. According to various embodiments, the housing 200 may include the second housing 202 and the first housing 201 movable with respect to the second housing 202. In various embodiments, it may be interpreted as a structure in which the second housing 202 is slidably disposed on the first housing 201 in the electronic device 101. According to an embodiment, the first housing 201 may be disposed to reciprocate by a predetermined distance in a direction illustrated with respect to the second housing 202, for example, a direction indicated by an arrow ①. The configuration of the electronic device 101 of FIGS. 2 and 3 may be partially or wholly identical to that of the electronic device 101 of FIG. 1.

According to an embodiment, the first housing 201 may be referred to as, for example, a first structure, a slide unit, or a slide housing, and disposed to reciprocate with respect to the second housing 202. According to an embodiment, the second housing 202 may be referred to as, for example, a second structure, a main unit, or a main housing. According to an embodiment, the second housing 202 may accommodate at least part of the first housing 201 and guide sliding movement of the first housing 201. According to an embodiment, at least part (e.g., a second display area A2) of a display 203 may be visually exposed to the outside of the housing 200. According to an embodiment, the housing 200 may accommodate various electrical and electronic components such as a main circuit board or a battery. According to an embodiment, a motor, a battery, a speaker, a SIM socket, and/or a sub-circuit board electrically connected to the main circuit board may be disposed in the first housing 201. The main circuit board on which electrical components such as an AP or a CP are mounted may be disposed in the second housing 202.

According to various embodiments, the first housing 201 may include a first plate 211 (e.g., a slide plate). According to an embodiment, the first plate 211 may support at least part (e.g., the second display area A2) of the display 203. According to an embodiment, the first plate 211 may include first sidewalls 211a, 211b and 211c to surround at least part of the display 203 and/or a multi-bar structure (e.g., a multi-bar structure 213 of FIG. 4). According to an embodiment, the first sidewalls 211a, 211b, and 211c may extend from the first plate 211. According to an embodiment, the first sidewalls 211a, 211b, and 211c may include a $(1\text{-}2)^{th}$ sidewall 211b, a $(1\text{-}3)^{th}$ sidewall 211c facing a direction opposite to the $(1\text{-}2)^{th}$ sidewall 211b, and a $(1\text{-}1)^{th}$ sidewall 211a extending from the $(1\text{-}2)^{th}$ sidewall 211b to the $(1\text{-}3)^{th}$ sidewall 211c. According to an embodiment, the $(1\text{-}1)^{th}$ sidewall 211a may be substantially perpendicular to the $(1\text{-}2)^{th}$ sidewall 211b and/or the $(1\text{-}3)^{th}$ sidewall 211c. According to an embodiment, in the closed state (e.g., FIG. 2) of the electronic device 101, the $(1\text{-}2)^{th}$ sidewall 211b may face a $(2\text{-}2)^{th}$ sidewall 221b of the second housing 202, and the $(1\text{-}3)^{th}$ sidewall 211c may face a $(2\text{-}3)^{th}$ sidewall 221c of the second housing 202. According to an embodiment, the first plate 211, the $(1\text{-}1)^{th}$ sidewall 211a, the $(1\text{-}2)^{th}$ sidewall 211b, and/or the $(1\text{-}3)^{th}$ sidewall 211c may be integrally formed. According to an embodiment, the first plate 211, the $(1\text{-}1)^{th}$ sidewall 211a, the $(1\text{-}2)^{th}$ sidewall 211b, and/or the $(1\text{-}3)^{th}$ sidewall 211c may be formed as separate housings and coupled or assembled with each other.

According to various embodiments, the second housing 202 may include second sidewalls 221a, 221b, and 221c to surround at least part of the first housing 201. According to an embodiment, the second sidewalls 221a, 221b, and 221c may extend from a second plate 221 and/or a cover member (e.g., a cover member 222 of FIG. 4). According to an embodiment, the second sidewalls 221a, 221b, and 221c may include the $(2\text{-}2)^{th}$ sidewall 221b, the $(2\text{-}3)^{th}$ sidewall 221c facing a direction opposite to the $(2\text{-}2)^{th}$ sidewall 221b, and a $(2\text{-}1)^{th}$ sidewall 221a extending from the $(2\text{-}2)^{th}$ sidewall 221b to the $(2\text{-}3)^{th}$ sidewall 221c. According to an embodiment, the $(2\text{-}1)^{th}$ sidewall 221a may be substantially perpendicular to the $(2\text{-}2)^{th}$ sidewall 221b and/or the $(2\text{-}3)^{th}$ sidewall 221c. According to an embodiment, the $(2\text{-}2)^{th}$ sidewall 221b may face the $(1\text{-}2)^{th}$ sidewall 211b, and the $(2\text{-}3)^{th}$ sidewall 221c may face the $(1\text{-}3)^{th}$ sidewall 211c. For example, in the closed state (e.g., FIG. 2) of the electronic device 101, the $(2\text{-}2)^{th}$ sidewall 221b may cover at least part of the $(1\text{-}2)^{th}$ sidewall 211b, and the $(2\text{-}3)^{th}$ sidewall 221c may cover at least part of the $(1\text{-}3)^{th}$ sidewall 211c.

According to various embodiments, the second housing 202 may be formed in a shape in which a portion (e.g., a front surface) is opened to accommodate (or surround) at least part of the first housing 201. For example, the first housing 201 may be connected to the second housing 202, while surrounded at least partially by the $(2\text{-}1)^{th}$ sidewall 221a, the $(2\text{-}2)^{th}$ sidewall 221b, and the $(2\text{-}3)^{th}$ sidewall 221c, and slidingly move in the direction of the arrow ① with the guidance of the second housing 202. According to an embodiment, the cover member 222 (e.g., the cover member 222 of FIG. 4), the $(2\text{-}1)^{th}$ sidewall 221a, the $(2\text{-}2)^{th}$ sidewall 221b, and/or the $(2\text{-}3)^{th}$ sidewall 221c may be integrally formed. According to an embodiment, the cover member 222, the $(2\text{-}1)^{th}$ sidewall 221a, the $(2\text{-}2)^{th}$ sidewall 221b, and the $(2\text{-}3)^{th}$ sidewall 221c may be formed as separate housings and coupled or assembled with each other.

According to various embodiments, the second housing 202 may include a rear plate 223. According to an embodiment, the rear plat 223 may form at least part of the exterior of the electronic device 101. For example, the rear plate 223 may provide a decorative effect to the exterior of the electronic device 101.

According to various embodiments, the cover member 222 (e.g., the cover member 222 of FIG. 4) and/or the $(2\text{-}1)^{th}$ sidewall 221a may cover at least part of the display 203. For example, at least part of the display 203 (e.g., the first display area A1) may be accommodated in the second housing 202, and the cover member 222 and/or the $(2\text{-}1)^{th}$ sidewall 221a may cover part of the display 203 accommodated in the second housing 202.

According to various embodiments, the electronic device 101 may include the display 203. For example, the display 203 may be interpreted as a flexible display or a rollable display. According to an embodiment, at least part (e.g., the first display area A1) of the display 203 may slidingly move based on sliding movement of the first housing 201. According to an embodiment, the display 203 may include or be disposed adjacent to a touch sensing circuit, a pressure sensor capable of measuring the intensity (pressure) of a touch, and/or a digitizer that detects a magnetic field-type stylus pen. The configuration of the display 203 illustrated in FIGS. 2 and 3 may be wholly or partially identical to that of the display module 160 of FIG. 1.

According to various embodiments, the display 203 may include the first display area A1 and the second display area A2. According to an embodiment, the second display area A2 may be an area that is always visible to the outside. According to an embodiment, the second display area A2 may be interpreted as an area that may not be located inside the housing 200 and/or the second housing 202. According to an embodiment, the first display area A1 may extend from the second display area A2, and may be inserted or accommodated into the second housing 202 or visually exposed to the outside of the second housing 202 according to sliding movement of the first housing 201. According to an embodiment, the second display area A2 may be seated on part of the first housing 201 (e.g., the first plate 211).

According to various embodiments, the first display area A1 may be accommodated in a space formed inside the housing 202 or between the first housing 201 and the second housing 202 or visually exposed to the outside by moving substantially with the guidance of the multi-bar structure (e.g., the multi-bar structure 213 of FIG. 4) mounted in the first housing 201. According to an embodiment, the first display area A1 may move based on the sliding movement of the first housing 201 in a width direction (e.g., the direction indicated by the arrow ①) of the first housing 201. For example, at least part of the first display area A1 may be unfolded or rolled along with the multi-bar structure (e.g., the multi-bar structure 213 of FIG. 4) based on the sliding movement of the first housing 201.

According to various embodiments, when the first housing 201 moves from the closed state to the open state, the first display area A1 may be gradually made visible to the outside of the housing 202, and form a substantially flat surface together with the second display area A2, when viewed from above the first housing 201. In an embodiment, the first display area A1 may be at least partially accommodated in the first housing 201 and/or the second housing 202.

According to various embodiments, the electronic device 101 may include at least one key input device 241, a connector hole 243, audio modules 247a and 247b, or camera modules 249a and 249b. While not shown, the electronic device 101 may further include an indicator (e.g., a light emitting diode (LED) device) or various sensor modules. The configurations of the audio modules 247a and 247b and/or the camera modules 249a and 249b in FIG. 2 and/or FIG. 3 may be partially or wholly identical to that of the audio module 170 and/or the camera module 180 of FIG. 1.

According to various embodiments, the key input devices 241 may be located in one area of the second housing 202. The electronic device 101 may be designed to be without at least one of the illustrated key input devices 241 or to include additional key input device(s) depending on its appearance and use state. According to an embodiment, the electronic device 101 may include a key input device (not shown), for example, a home key button or a touch pad disposed in the vicinity of the home key button. According to an embodiment (not shown), at least some of the key input devices 241 may be disposed on the first housing 201.

According to various embodiments, the connector hole 243 may be omitted, and may accommodate a connector (e.g., a USB connector) for transmitting/receiving power and/or data to and from an external electronic device. While not shown, the electronic device 101 may include a plurality of connector holes 243, and some of the plurality of connector holes 243 may function as connector holes for transmitting and receiving audio signals to and from an external electronic device. Although the connector hole 243 is disposed on the $(2-3)^{th}$ sidewall 221c in the illustrated embodiment, the disclosure is not limited thereto, and the connector hole 243 or a connector hole (not shown) may be disposed on the $(2-1)^{th}$ sidewall 221a or the $(2-2)^{th}$ sidewall 221b.

According to various embodiments, the audio modules 247a and 247b may include at least one speaker hole 247a and 247b and/or at least one microphone hole. At least one of the speaker holes 247a and 247b may be provided as an external speaker hole. At least one of the speaker holes 247a and 247b may be provided as a receiver hole for a voice call. The electronic device 101 may include a microphone for obtaining a sound, and the microphone may obtain an external sound of the electronic device 101 through the microphone hole. According to an embodiment, the electronic device 101 may include a plurality of microphones to detect the direction of a sound. According to an embodiment, the electronic device 101 may include an audio module in which the speaker holes 247a and 247b and the microphone hole are implemented as one hole, or may include a speaker (e.g. a piezo speaker) in which the speaker hole 247a is excluded.

According to various embodiments, the camera modules 249a and 249b may include a first camera module 249a and/or a second camera module 249b. The second camera module 249b may be located in the second housing 202 and capture a subject in a direction opposite to the second display area A2 of the display 203. The electronic device 101 may include a plurality of camera modules 249a and 249b. For example, the electronic device 101 may include at least one of a wide-angle camera, a telephoto camera, or a close-up camera. According to an embodiment, the electronic device 101 may include an IR projector and/or an IR receiver to measure a distance to a subject. Each of the camera modules 249a and 249b may include one or more lenses, an image sensor, and/or an image signal processor. The electronic device 101 may further include another camera module (the first camera module 249a, for example, a front camera) for capturing a subject in a direction opposite to the second camera module 249b. For example, the first camera module 249a may be disposed around the second display area A2 or in an area overlapping with the second display area A2. When the first camera module 249a is disposed in the area overlapping with the display 203, it may capture a subject through the display 203.

According to various embodiments, the indicator (e.g., an LED device) of the electronic device 101 may be disposed in the first housing 201 and/or the second housing 202, and as the electronic device 101 includes an LED, the LED may provide state information about the electronic device 101 as a visual signal. The sensor module (e.g., the sensor module 176 of FIG. 1) of the electronic device 101 may generate an electrical signal or a data value corresponding to an internal operation state or external environmental state of the electronic device 101. The sensor module may include, for example, a proximity sensor, a fingerprint sensor, or a biometric sensor (e.g., an iris/face recognition sensor or a heart rate monitor (HRM) sensor). In an embodiment, the electronic device 101 may further include at least one of a gesture sensor, a gyro sensor, a barometric pressure sensor, a magnetic sensor, an acceleration sensor, a grip sensor, a color sensor, an IR sensor, a temperature sensor, a humidity sensor, or an illuminance sensor. The configurations of the display 203, the audio modules 247a and 247b, and the camera modules 249a and 249b of FIGS. 2 and 3 may be wholly or partially identical to those of the display module 160, the audio module 170, and the camera module 180 of FIG. 1.

Figure 4:
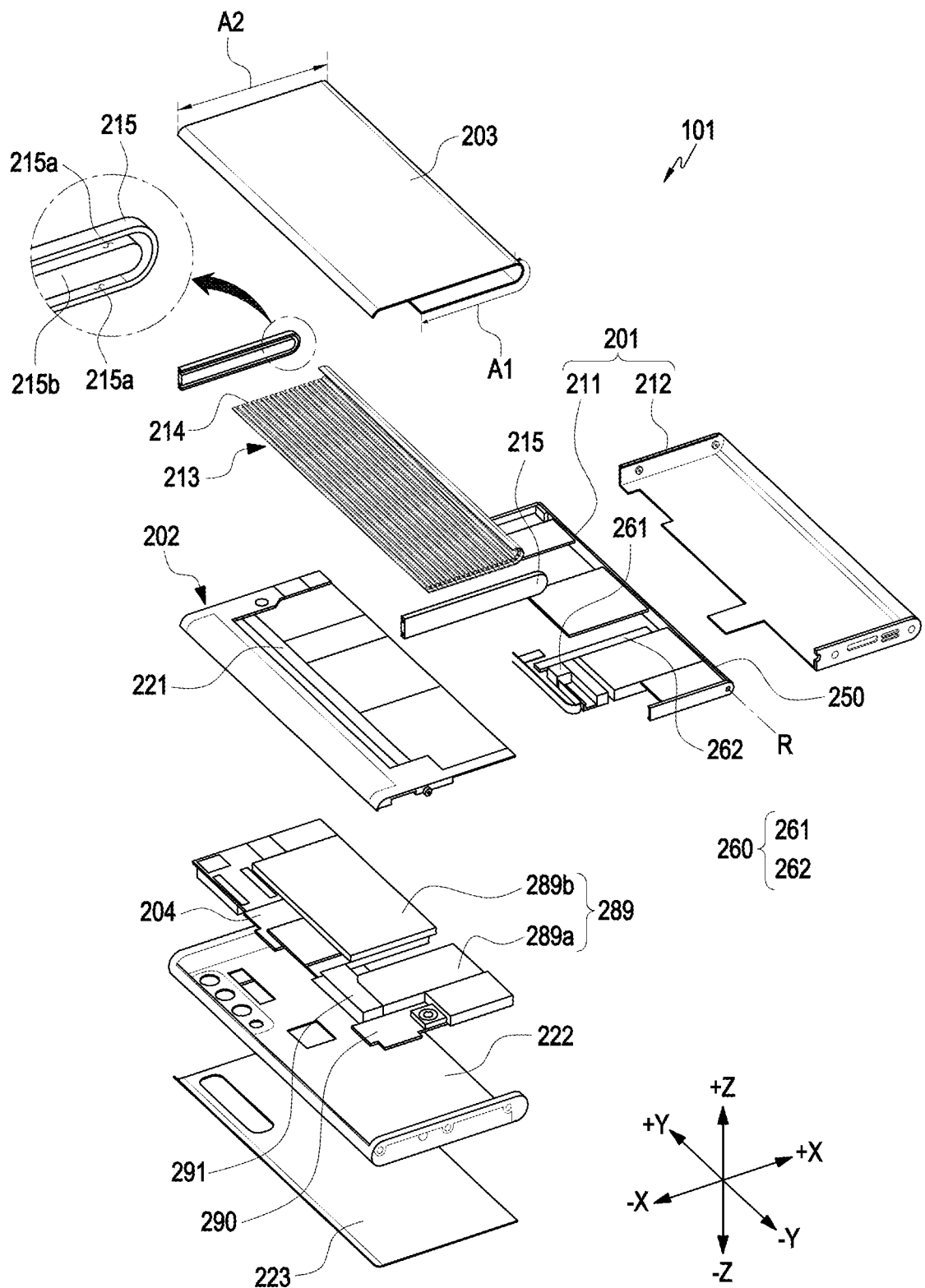
FIG. 4 is an exploded perspective view illustrating an electronic device according to various embodiments.

FIG. 4 is an exploded perspective view illustrating an electronic device according to various embodiments.

For convenience of description, in FIGS. 4 to 13, an X-axis direction may be defined and/or interpreted as a width direction of the electronic device 101 and components of the electronic device 101 and/or a sliding movement direction of the first housing 201, a Y-axis direction may be defined and/or interpreted as a longitudinal direction of the electronic device 101 and the components of the electronic device 101, and a Z-axis direction may be defined and/or interpreted as a height and/or thickness direction of the electronic device 101 and the components of the electronic device 101.

Referring to FIG. 4, the electronic device 101 may include the first housing 201, the second housing 202, the display 203, and/or the multi-bar structure 213. Part (e.g., the first display area A1) of the display 203 may be accommodated in the electronic device 101 with the guidance of the multi-bar structure 213. The configuration of the first housing 201, the second housing 202, and/or the display 203 illustrated in FIG. 4 may be partially or wholly identical to that of the first housing 201, the second housing 202, and/or the display 203 illustrated in FIGS. 2 and/or 3.

According to various embodiments, the first housing 201 may include the first plate 211 and a slide cover 212. The first plate 211 and the slide cover 212 (e.g., a first cover) may linearly reciprocate in one direction (e.g., the direction indicated by the arrow ① in FIG. 3 or the X-axis direction in FIG. 4) with the guidance of the second housing 202. According to an embodiment, the first plate 211 together with the slide cover 212 may slidingly move with respect to the second housing 202. For example, at least part of the display 203 and/or at least part of the multi-bar structure 213 may be disposed between the first plate 211 and the slide cover 212. According to an embodiment, the slide cover 212 may be coupled with the first plate 211 and configured to cover at least part of the first display area A1.

According to an embodiment, the first plate 211 may support at least part (e.g., the first display area A1) of the display 203. For example, the first plate 211 may include a curved surface 250, and the first display area A1 (e.g., the first display area A1 of FIGS. 2 and 3) of the display 203 may be located on the curved surface 250. According to an embodiment, the first plate 211 may be interpreted as a display support bar (DSB).

According to an embodiment, the slide cover 212 may protect the display 203 located on the first plate 211. For example, at least part of the display 203 may be located between the first plate 211 and the slide cover 212. According to an embodiment, the first plate 211 and the slide cover 212 may be formed of a metal material and/or a non-metal (e.g., polymer) material.

According to various embodiments, the first housing 201 may include a first guide rail 215. According to an embodiment, the first guide rail 215 may be connected to the first plate 211 and/or the slide cover 212. For example, the first guide rail 215 may slidingly move with respect to the second housing 202, together with the first plate 211 and the slide cover 212.

According to various embodiments, the electronic device 101 may include the multi-bar structure 213. According to an embodiment, the multi-bar structure 213 may support the display 203. For example, the multi-bar structure 213 may be connected to the display 203. According to an embodiment, at least part of the display 203 and the multi-bar structure 213 may be located between the first plate 211 and the slide cover 212. According to an embodiment, as the first housing 201 slidingly moves, the multi-bar structure 213 may move with respect to the second housing 202. In the closed state (e.g., FIG. 2), most of the multi-bar structure 213 may be accommodated in the second housing 202. According to an embodiment, at least part of the multi-bar structure 213 may move in response to the curved surface 250 located at an edge of the first plate 211.

According to various embodiments, the multi-bar structure 213 may include a plurality of bars (or rods) 214. The plurality of rods 214 may extend in a straight line, be disposed parallel to a rotation axis R formed by the curved surface 250, and be arranged along a direction perpendicular to the rotation axis R (e.g., a sliding movement direction of the first housing 201).

According to various embodiments, each rod 214 may revolve around another adjacent rod 214, while remaining parallel to the other adjacent rod 214. According to an embodiment, as the first housing 201 slidingly moves, the plurality of rods 214 may be arranged in a curved shape or a flat shape. For example, as the first housing 201 slidingly moves, part of the multi-bar structure 213 facing the curved surface 250 may form a curved surface, whereas the other part of the multi-bar structure, which does not face the curved surface 250, may form a flat surface. According to an embodiment, the first display area A1 of the display 203 may be mounted or supported on the multi-bar structure 213, and at least part of the first display area A1 together with the second display area A2 may be visible to the outside of the second housing 202 in the open state (e.g., FIG. 3). In the state in which the first display area A1 is visible to the outside of the second housing 202, the multi-bar structure 213 may form a substantially flat surface and thus support or maintain the first display area A1 in a flat state. According to an embodiment, the multi-bar structure 213 may be replaced with a flexible integrated support member (not shown). According to an embodiment, the multi-bar structure 213 may be interpreted as display-supporting multiple bars or a multi-joint hinge structure.

According to various embodiments, the first guide rail 215 may guide movement of the plurality of rods 214. According to an embodiment, the first guide rail 215 may include an upper guide rail adjacent to the $(1\text{-}2)^{th}$ sidewall (e.g., the $(1\text{-}2)^{th}$ sidewall 211b in FIG. 3) and a lower guide rail adjacent to the $(1\text{-}3)^{th}$ sidewall (e.g., the $(1\text{-}3)^{th}$ 211c in FIG. 3). According to an embodiment, the first guide rail 215 may include a groove-shaped rail 215a formed inside the first guide rail 215 and a protrusion portion 215b located inside the guide rail. At least part of the protrusion portion 215b may be surrounded by the rail 215a. According to an embodiment, the multi-bar structure 213 may be located between the upper guide rail and the lower guide rail, and move while being kept fitted in the upper guide rail and the lower guide rail. For example, top portions and/or bottom portions of the plurality of rods 214 may slidingly move along the rail 215a, while being fitted in the rail 215a.

According to an embodiment, when the electronic device 101 is opened (e.g., a slide-out operation), the size of an area of the display 203 visible to the outside may be increased. For example, the first plate 211 connected to a motor 261 may slide out by driving of the motor 261 (e.g., driving for display slide-out) and/or an external force provided by a user, the protrusion portion 215b inside the first guide rail 215 may push the top portions and/or bottom portions of the plurality of rods 214. Accordingly, the display 203 accommodated between the first plate 211 and the slide cover 212 may extend to the front surface.

According to an embodiment, when the electronic device 101 is closed (e.g., a slide-in operation), the size of the area of the display 203 visible to the outside may be reduced. For example, the first plate 211 with the motor disposed thereon may slide in by driving of the motor 261 (e.g., driving for display slide-in) and/or an external force provided by the user, and an outer portion (e.g., a portion other than the protrusion 215b) of the rail 215 may push the top portions and/or bottom portions of the plurality of rods 214. Accordingly, the extended display 203 may be accommodated between the first plate 211 and the slide cover 212.

According to various embodiments, the second housing 202 may include the second plate 221, the cover member 222 (e.g., a second cover), and the rear plate 223. According to an embodiment, the second plate 221 may support at least part (e.g., the second display area A2) of the display 203. The second plate 221 may be disposed between the display 203 and the main circuit board 204. According to an embodiment, the cover member 222 may accommodate components (e.g., a battery 289 (e.g., the battery 189 of FIG. 1) and the main circuit board 204) of the electronic device 101 and protect the components of the device 101. According to an embodiment, the cover member 222 may be referred to as a book cover. According to an embodiment, the second plate 221 may include one surface facing at least part of the display 203 and the other surface facing the cover member 222 in a direction opposite to the one surface.

According to various embodiments, a plurality of boards may be accommodated in the second housing 202. A processor, memory, and/or an interface may be mounted on the main circuit board 204. The processor may include, for example, at least one of a central processing unit (CPU), an AP, a graphics processing unit (GPU), an image signal processor, a sensor hub processor, or a CP. According to various embodiments, the main circuit board 204 may include a flexible printed circuit board type radio frequency cable (FRC). For example, the main circuit board 204 may be disposed in the cover member 222 and electrically connected to an antenna module (e.g., the antenna module 197 of FIG. 1) and a communication module (e.g., the communication module 190 of FIG. 1).

According to an embodiment, the memory may include, for example, volatile memory or non-volatile memory.

According to an embodiment, the interface may include, for example, an HDMI, a USB interface, an SD card interface, and/or an audio interface. The interface may, for example, electrically or physically connect the electronic device 101 to an external electronic device, and include a USB connector, an SD card/multimedia card (MMC) connector, or an audio connector.

According to various embodiments, the electronic device 101 may further include a separate sub circuit board 290 spaced apart from the main circuit board 204 in the second housing 202. The sub circuit board 290 may be electrically connected to the main circuit board 204 through a flexible board 291. The sub circuit board 290 may be electrically connected to the battery 289 or electrical components disposed at an end of the electronic device 101, such as a speaker and/or a SIM socket, and transmit signals and power.

According to various embodiments, the battery 289, which is a device for supplying power to at least one component of the electronic device 101, may include, for example, a non-rechargeable primary cell, or a rechargeable secondary cell, or a fuel cell. At least part of the battery 289 may be disposed on substantially the same plane as the main circuit board 204, for example. The battery 289 may be integrally disposed inside the electronic device 101 or may be disposed detachably from the electronic device 101.

According to various embodiments, the battery 289 may be formed as one integrated battery or include a plurality of separate batteries (e.g., a first battery 289a and a second battery 289b). According to an embodiment, when the integrated battery is located on the first plate 211, the integrated battery may move along with sliding movement of the first plate 211. According to an embodiment, when the integrated battery is located on the second plate 221, the integrated battery may be fixedly disposed on the second plate 221, regardless of the sliding movement of the first plate 211. According to an embodiment, when the first battery 289a among the separate batteries is located on the first plate 211, and the second battery 289b among the separate batteries is fixed on the second plate 221, the first battery 289a may move along with the sliding movement of the first plate 211.

According to various embodiments, the rear plate 223 may form substantially at least part of the exterior of the second housing 202 or the electronic device 101. For example, the rear plate 223 may be coupled with the outer surface of the cover member 222. According to an embodiment, the rear plate 223 may be integrally formed with the cover member 222. According to an embodiment, the rear plate 223 may provide a decorative effect to the exterior of the electronic device 101. The second plate 221 and the cover member 222 may be formed of at least one of a metal or a polymer, and the rear plate 223 may be formed of at least one of a metal, glass, a synthetic resin, or ceramic. According to an embodiment, the second plate 221, the cover member 222, and/or the rear plate 223 may be formed of a material that transmits light at least partially (e.g., to an auxiliary display area). For example, with part (e.g., the first display area A1) of the display 203 accommodated in the electronic device 101, the electronic device 101 may output visual information using the first display area A1. The auxiliary display area may be part of the second plate 221, the cover member 222, and/or the rear plate 223, on which the display 203 accommodated in the second housing 202 is located.

According to an embodiment, the electronic device 101 may include a driver 260 configured to provide a driving force for sliding movement to the first housing 201. According to an embodiment, the driver 260 may include the motor 261 and a gear structure 262 (e.g., a rack gear and/or a pinion gear) connected to the motor 261. For example, the electronic device 101 may include the motor 261 connected to and/or coupled with the first housing 201 (e.g., the first plate 211). According to an embodiment, the gear structure 262 may include the rack gear connected to and/or coupled with the second housing 202 (e.g., the second plate 221) and/or the pinion gear connected to the motor. According to an embodiment, the pinion gear may rotate by receiving a driving force from the motor 261, the pinion gear and the motor 261 may slidingly move on the rack gear in one direction (e.g., the X-axis direction in FIG. 4), and the first housing 201 (e.g., the first plate 211) connected to the motor 261 may slidingly move in the one direction (e.g., the X-axis direction in FIG. 4) together with the motor 261.

According to an embodiment, the motor 261 may be connected to and/or coupled with the second housing 202 (e.g., the second plate 221), and the gear structure 262 (e.g., the rack gear) may be connected to and/or coupled with the first housing 201 (e.g., the first plate 211). According to an embodiment, the pinion gear may be rotated according to rotation of the motor 261, the rack gear connected to the pinion gear may slidingly move in one direction (e.g., the X-axis direction in FIG. 4), and the first housing (e.g., the first plate 211) connected to the rack gear may slidingly move in the one direction (e.g., the X-axis direction in FIG. 4), together with the rack gear.

While the electronic device 101 illustrated in FIGS. 2, 3 and 4 has the appearance of a rollable or slidable one, the disclosure is not limited thereto. According to an embodiment (not shown), at least part of the illustrated electronic device may be rolled into the shape of a scroll.

Referring to FIGS. 2, 3 and 4, when viewed from the front of the electronic device 101, the display 203 may extend to the right of the electronic device 101. However, the structure of the electronic device 101 is not limited thereto. For example, according to an embodiment, the display 203 may extend to the left of the electronic device 101.

Figure 5A:
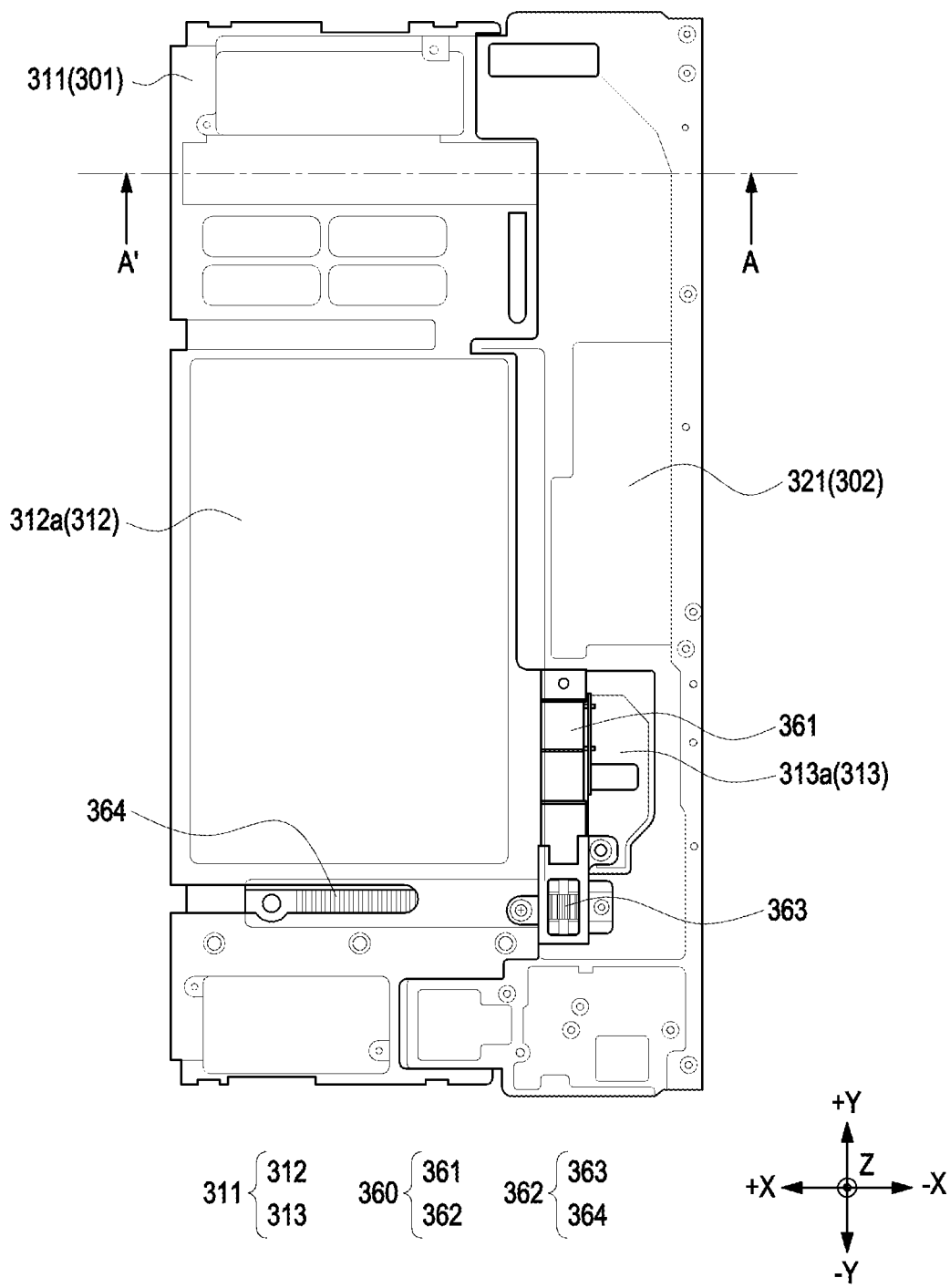
FIG. 5A is a diagram illustrating a first housing and a second housing in a closed state of an electronic device according to various embodiments.
Figure 5B:
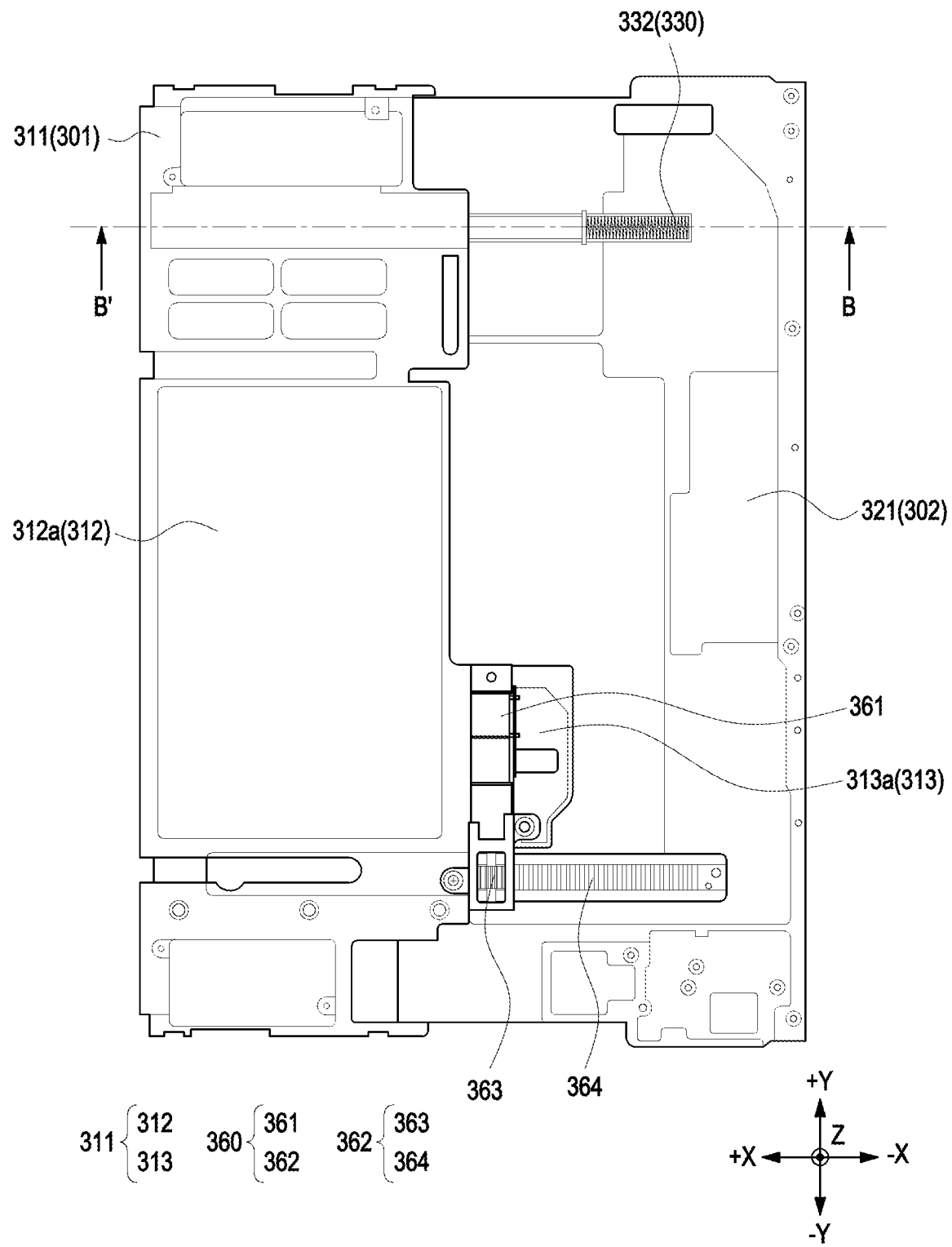
FIG. 5B is a diagram illustrating a first housing and a second housing in an open state of an electronic device according to various embodiments.

FIG. 5A is a diagram illustrating a first housing and a second housing in a closed state of an electronic device according to various embodiments. FIG. 5B is a diagram illustrating a first housing and a second housing in an open state of an electronic device according to various embodiments.

Referring to FIG. 5A and/or FIG. 5B, the electronic device 101 (e.g., the electronic device 101 of FIGS. 1 to 4) may include a first housing 301, a second housing 302, an elastic member 330, and/or a driver 360.

The configuration of the first housing 301, the second housing 302, and/or the driver 360 of FIGS. 5A and/or 5B may be partially or wholly identical to that of the first housing 201, the second housing 202, and/or the driver 260 of FIG. 4.

According to various embodiments, the first housing 301 (e.g., the first housing 201 of FIG. 4) may include a first plate 311 (e.g., the first plate 211 and the slide plate of FIG. 4). According to various embodiments, the second housing 302 (e.g., the second housing 202 of FIG. 4) may include a second plate 321 (e.g., the second plate 221 of FIG. 4). According to an embodiment, the first plate 311 may slidingly move on the second plate 321 in a first movement direction (e.g., a +X direction in FIG. 5) or in a second movement direction (e.g., a −X direction in FIG. 5) opposite to the first movement direction.

According to various embodiments, the first plate 311 may include a $(1-1)^{th}$ plate area 312 and/or a $(1-2)^{th}$ plate area 313. According to an embodiment, the $(1-1)^{th}$ plate area 312 and the $(1-2)^{th}$ plate area 313 may be integrally formed. According to an embodiment, the $(1-1)^{th}$ plate area 312 and the $(1-2)^{th}$ plate area 313 may be formed as separate members and coupled or assembled with each other.

According to various embodiments, at least part of the $(1-1)^{th}$ plate area 312 may support the display (not shown) (e.g., the display 203 of FIG. 4). According to an embodiment, the $(1-1)^{th}$ plate area 312 may support at least part of the second display area (not shown) (e.g., the second display area A2 of FIGS. 2, 3 and 4) in the closed state (e.g., FIG. 2) of the electronic device 101, and at least part of the first display area (not shown) (e.g., the first display area A1 of FIGS. 2, 3 and 4) in the open state (e.g., FIG. 3) of the electronic device 101. According to various embodiments, the $(1-1)^{th}$ plate area 312 may simultaneously support at least part of the first display area A1 and at least part of the second display area A2.

According to an embodiment, the $(1-1)^{th}$ plate area 312 may include a first surface 312a facing a first direction (e.g., the −Z direction in FIG. 4) in the closed state (e.g., FIG. 2) of the electronic device 101, and a second surface (e.g., a second surface 312b of FIG. 6b) facing a second direction (e.g., the +Z direction in FIG. 4) opposite to the first direction (e.g., the −Z direction in FIG. 4).

According to an embodiment, the first surface 312a of the $(1-1)^{th}$ plate area 312 may be a surface facing the cover member (not shown) (e.g., the cover member 222 of FIG. 4) of the second housing 302 in the closed state (e.g., FIG. 2) of the electronic device 101. According to an embodiment, the second surface (e.g., the second surface 312b of FIG. 6B) of the $(1-1)^{th}$ plate area 312 may be a surface supporting at least part of the display (not shown) (e.g., the display 203 of FIG. 4) in the closed state (e.g., FIG. 2) or the open state (e.g., FIG. 3) of the electronic device 101. According to an embodiment, in the closed state of the electronic device 101, at least part of the $(1-1)^{th}$ plate area 312 may be disposed between the second plate 321 and the cover member (not shown) (e.g., the cover member 222 of FIG. 4).

According to various embodiments, the $(1-2)^{th}$ plate area 313 may extend to protrude from part of the $(1-1)^{th}$ plate area 312. According to an embodiment, the $(1-2)^{th}$ plate area 313 may include a first surface 313a facing the first direction (e.g., the −Z direction in FIG. 4) and a second surface (e.g., a second surface 313b of FIG. 6B) facing the second direction (e.g., the +Z direction in FIG. 4) opposite to the first direction (e.g., the −Z direction in FIG. 4) in the closed state (e.g., FIG. 2) of the electronic device 101.

According to an embodiment, the first surface 313a of the $(1-2)^{th}$ plate area 313 may be a surface facing the cover member (not shown) (e.g., the cover member 222 of FIG. 4) of the second housing 302 in the closed state (e.g., FIG. 2) of the electronic device 101. According to an embodiment, the second surface (e.g., the second surface 313b of FIG. 6B) of the $(1-2)^{th}$ plate area 313 may be a surface supporting at least part of the display (not shown) (e.g., the display 203 of FIG. 4) in the closed state (e.g., FIG. 2) or the open state (e.g., FIG. 3) of the electronic device 101. According to an embodiment, a motor 361 (e.g., the motor 361 of FIG. 4) may be coupled with and/or connected to the first surface 313a of the $(1-2)^{th}$ plate area 313. According to various embodiments (not shown), the motor 361 may be coupled with and/or connected to the second surface (e.g., the second surface 313b of FIG. 6B) of the $(1-2)^{th}$ plate area 313.

According to various embodiments, the driver 360 (e.g., the driver 260 of FIG. 4) may include the motor 361 (e.g., the motor 261 of FIG. 4) and/or a gear structure 362 (e.g., the gear structure 262 of FIG. 4). According to various embodiments, the driver 360 may provide a driving force for sliding movement to the first housing 301 (e.g., the first plate 311).

According to various embodiments, the gear structure 362 may include a pinion gear 363 connected to a rotation shaft of the motor 361 and/or a rack gear 364 connected to the pinion gear 363.

According to an embodiment, the motor 361 may be coupled with and/or connected to the $(1-2)^{th}$ plate area 313 of the first plate 311. In an embodiment, the motor 361 may be coupled with and/or connected to the first surface 313a of the $(1-2)^{th}$ plate area 313. In an embodiment, the motor 361 may be coupled with and/or connected to the second surface (e.g., the second surface 313b of FIG. 6B) of the $(1-2)^{th}$ plate area 313. For example, the motor 361 may have a fixed position on the first plate 311. According to an embodiment, the rack gear 364 may be coupled with and/or connected to the second plate 321. For example, the rack gear 364 may have a fixed position on the second plate 321. According to an embodiment, the pinion gear 363 may be rotated together with the motor 361 according to rotation of the motor 361. As the pinion gear 363 rotates on the rack gear 364, the motor 361 may slidingly move in the sliding movement direction (e.g., the X-axis direction of FIGS. 5A and 5B). Accordingly, the first housing 301 (e.g., the first plate 311) connected to the motor 361 may slidingly move together with the motor 361 in the sliding movement direction (e.g., the X-axis direction in FIGS. 5A and 5B).

According to an embodiment (not shown), the motor 361 may be coupled with and/or connected to the second plate 321. For example, the motor 361 may have a fixed position on the second plate 321. According to an embodiment, the rack gear 364 may be coupled with and/or connected to the first plate 311. For example, the rack gear 364 may have a fixed position on the first plate 311. According to an embodiment, the pinion gear 363 may be rotated together with the motor 361 according to rotation of the motor 361. As the pinion gear 363 rotates on the rack gear 364, the rack gear 364 may slidingly move in the sliding movement direction (e.g., the X-axis direction of FIGS. 5A and 5B). Accordingly, the first housing 301 (e.g., the first plate 311) connected to the rack gear 364 may slidingly move together with the rack gear 364 in the sliding movement direction (e.g., the X-axis direction in FIGS. 5A and 5B).

Referring to FIG. 5B, the elastic member 330 may be disposed in the second housing 302 (e.g., the second plate 321). According to various embodiments, when the electronic device 101 is opened (e.g., the slide-out operation) or closed (e.g., the slide-in operation), the elastic member 330 may be compressed by the first housing 301 (e.g., the first plate 311). According to various embodiments, the elastic member 330 may include a first elastic member (not shown) (e.g., a first elastic member 331 of FIG. 7) and/or a second elastic member 332.

A sliding movement operation of the electronic device 101 will be described with reference to FIGS. 5A and 5B.

Referring to FIG. 5A, an arrangement relationship between the first plate 311 and the second plate 321 in the closed state of the electronic device 101 (e.g., FIG. 2 or FIG. 5A) is illustrated. For example, according to rotation of the motor 361 in the first direction, the first plate 311 may slidingly move in a direction in which the first plate 311 moves away from the second plate 321 (e.g., the +X direction in FIGS. 5A and 5B).

Referring to FIG. 5B, an arrangement relationship between the first plate 311 and the second plate 321 in the open state of the electronic device 101 (e.g., FIG. 3 or FIG. 5B) is illustrated. For example, according to rotation of the motor 361 in the second direction opposite to the first direction, the first plate 311 may slidingly move in a direction in which the first plate 311 moves nearer to the second plate 321 (e.g., the −X direction in FIGS. 5A and 5B).

Figure 6A:
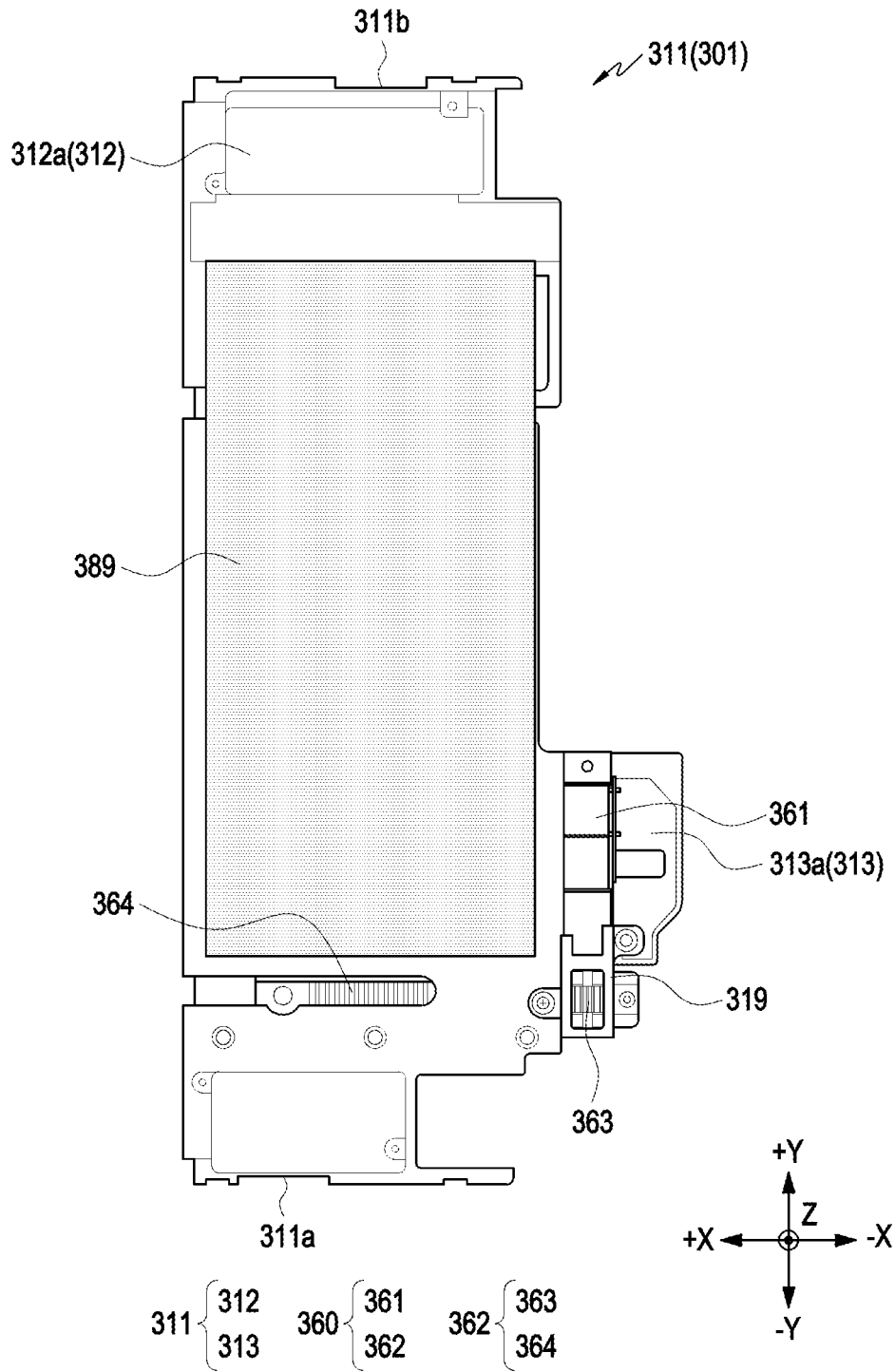
FIG. 6A is a diagram illustrating front view of a first plate according to various embodiments.
Figure 6B:
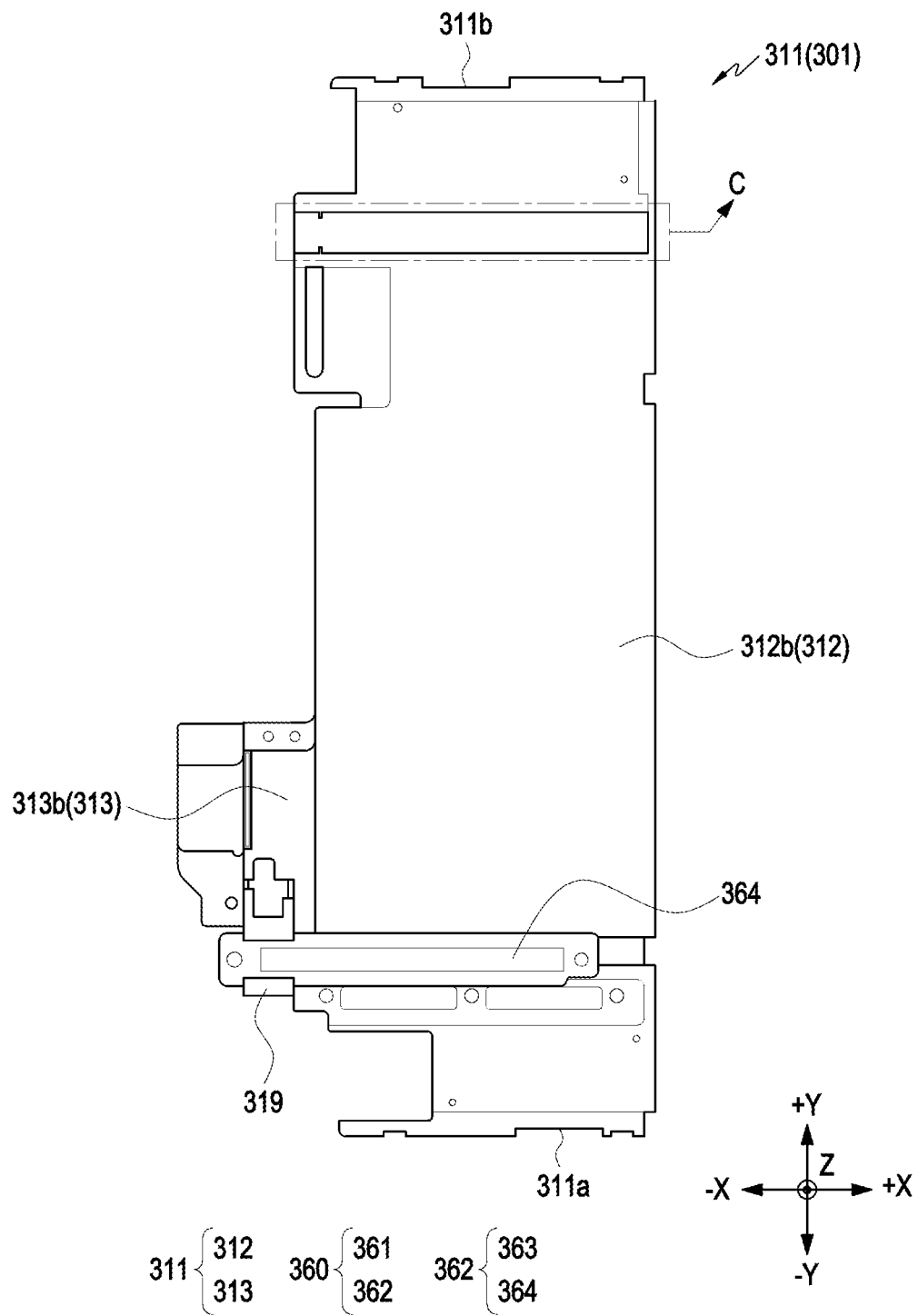
FIG. 6B is a diagram illustrating a rear view of a first plate according to various embodiments.
Figure 6C:
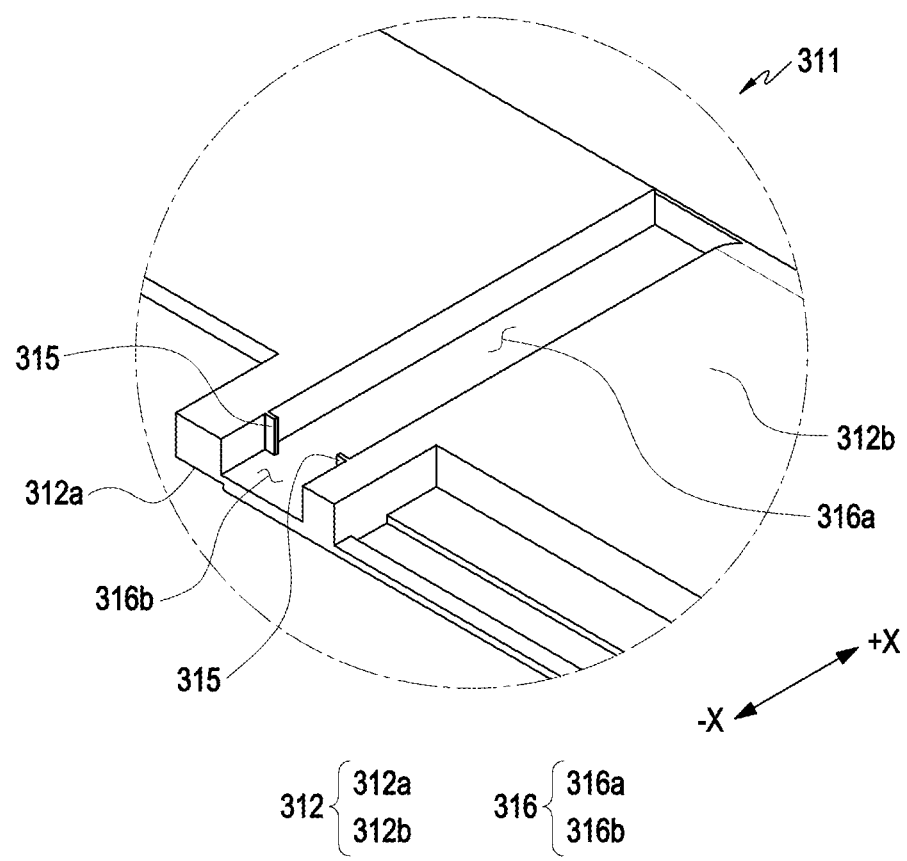
FIG. 6C is an enlarged partial perspective view illustrating a part C of FIG. 6B according to various embodiments.

FIG. 6A is a diagram illustrating a front view of a first plate according to various embodiments. FIG. 6B is a diagram illustrating a rear view of a first plate according to various embodiments. FIG. 6C is an partial enlarged perspective view illustrating a part C of FIG. 6B according to various embodiments. For example, FIG. 6A may be a view viewed from the −Z direction to the +Z direction in FIG. 4, and FIG. 6B may be a view viewed from the +Z direction to the −Z direction in FIG. 4.

Referring to FIG. 6A and/or FIG. 6B, an electronic device (e.g., the electronic device 101 of FIGS. 1 to 5B) may include the first plate 311, a bracket 319, the driver 360, and/or a battery 389.

The configuration of the first plate 311 and/or the driver 360 of FIG. 6A and/or FIG. 6B may be partially or wholly identical to that of the first plate 311 and/or the driver 360 of FIG. 5A and/or FIG. 5B. The configuration of the battery 389 of FIG. 6A and/or FIG. 6B may be partially or wholly identical to that of the battery 289 of FIG. 4.

According to various embodiments, the first plate 311 (e.g., the first plate 311 of FIGS. 5A and 5B) may include the $(1-1)^{th}$ plate area 312 (e.g., the $(1-1)^{th}$ plate area 312 of FIGS. 5A and 5B) and/or the $(1-2)^{th}$ plate area 313 (e.g., the $(1-2)^{th}$ plate area 313 of FIGS. 5A and 5B).

According to various embodiments, the $(1-1)^{th}$ plate area 312 may face the first surface 312a (e.g., the first surface 312a of FIGS. 5A and 5B) and the second surface 312b facing the direction opposite to the first surface 312a.

According to various embodiments, the $(1-2)^{th}$ plate area 313 may face the first surface 313a (e.g., the first surface 313a of FIGS. 5A and 5B) and the second surface 313b facing the direction opposite to the first surface 313a.

According to various embodiments, the driver 360 (e.g., the driver 360 of FIGS. 5A and 5B) may include the motor 361 (e.g., the motor 361 of FIGS. 5A and 5B) coupled with and/or connected to the $(1-2)^{th}$ plate area 313, and the gear structure 362 (e.g., the gear structure 362 of FIGS. 5A and 5B) connected to the motor 361.

According to various embodiments, the gear structure 362 may include the pinion gear 363 (e.g., the pinion gear 363 of FIGS. 5A and 5B) connected to the rotation shaft of the motor 361 and/or the rack gear 364 (e.g., the rack gear 364 of FIGS. 5A and 5B) connected to the pinion gear 363. According to an embodiment, the rack gear 364 may be coupled with and/or connected to the second plate (not shown) (e.g., the second plate 321 of FIGS. 5A and 5B).

According to an embodiment, the first plate 311 may further include the bracket 319 connected to the first plate 311. According to an embodiment, the bracket 319 may support at least part of the rack gear 364. According to an embodiment, the bracket 319 may support at least part of one surface (e.g., the surface illustrated in FIG. 6A or the surface facing the +Z direction in FIG. 4) of the rack gear 364 and at least part of the other surface (e.g., the surface illustrated in FIG. 6B or the surface facing the −Z direction in FIG. 4) of the rack gear 364. According to an embodiment, the bracket 319 may simultaneously support at least parts of one surface and the other surface of the rack gear 364. Accordingly, movement of the bracket 319 in a thickness direction (e.g., the Z-axis direction in FIG. 4 or the Z-axis direction of FIGS. 6A and 6B) of the rack gear 364 may be restricted, and when the first plate 311 coupled with the bracket 319 slidingly moves on the second plate 321, movement of the first plate 311 in the thickness direction (e.g., in the Z-axis direction in FIG. 4 or the Z-axis direction of FIGS. 6A and 6B) of the rack gear 364 may be restricted.

According to various embodiments, the battery 389 (e.g., the battery 289 of FIG. 4) may be coupled with and/or disposed on the first plate 311. According to an embodiment, the battery 389 may be coupled with and/or disposed on the first surface 312a of the $(1-1)^{th}$ plate area 312. According to an embodiment (not shown), the battery 389 may be coupled with and/or disposed on the second surface 312b of the $(1-1)^{th}$ plate area 312. According to an embodiment (not shown), the battery 389 may be coupled with and/or disposed on the second plate (not shown) (e.g., the second plate 321 of FIGS. 5A and 5B).

Referring to FIG. 6C, the first plate 311 may include an accommodation groove 316 which is at least partially recessed, and a first protrusion member 315 protruding from the accommodation groove 316.

According to an embodiment, the accommodation groove 316 may be in the shape of a groove recessed from the second surface 312b of the $(1-1)^{th}$ plate area 312 toward the first surface 312a of the $(1-1)^{th}$ plate area 312. According to an embodiment, the accommodation groove 316 may extend along the sliding movement direction (e.g., the X-axis direction of FIGS. 6A, 6B and 6C) of the first plate 311. According to an embodiment, the accommodation groove 316 may be partitioned into a first accommodation groove 316a located in a first direction (e.g., the +X direction in FIG. 6C) with respect to the first protrusion member 315, and a second accommodation groove 316b located in a second direction (e.g., the −X direction in FIG. 6C) opposite to the first direction (e.g., the +X direction in FIG. 6C) with respect to the first protrusion member 315. According to an embodiment, the first accommodation groove 316a and the second accommodation groove 316b may have a second guide rail (not shown) (e.g., a second guide rail 322 of FIG. 7) disposed therein.

According to an embodiment, the first protrusion member 315 may protrude from at least part of the accommodation groove 316. According to an embodiment, a pair of first protrusion members 315 may be provided, and each of the first protrusion members 315 may protrude from one of sidewalls of the accommodation groove 316 facing each other toward the other sidewall in the opposite direction. According to an embodiment, the first protrusion member 315 may extend in the thickness direction (e.g., the Z-axis direction in FIG. 4 or the Z-axis direction in FIGS. 6A and 6B) of the first plate 311. According to an embodiment (not shown), the first protrusion member 315 may be provided as a single member, and protrude from any one of the sidewalls of the accommodation grooves 316 facing each other toward the other sidewall in the opposite direction. According to an embodiment (not shown), a plurality of first protrusion members 315 may be provided, and each of the first protrusion members 315 may protrude from one of the sidewalls facing each other toward the other sidewall in the opposite direction. The plurality of first protrusion members 315 may be arranged to be spaced apart from each other along the sliding movement direction (e.g., the X-axis direction of FIGS. 6A, 6B and 6C) of the first plate 311.

According to an embodiment, the gear structure 362 may be disposed adjacent to one end (e.g., an end facing the −Y direction of FIGS. 6A and 6B) of the battery 389, and an elastic member (not shown) (e.g., the elastic member 330 of FIG. 7) may be disposed adjacent to the other end (e.g., the end facing the +Y direction of FIGS. 6A and 6B) of the battery 389 facing the opposite direction to the one end of the battery 389.

According to an embodiment, at least part of the gear structure 362 (e.g., the rack gear 364) may be disposed between a first side surface 311a facing a first direction (e.g., the −Y direction of FIGS. 6A and 6B) and a second side surface 311b facing a second direction (e.g., the +Y direction of FIGS. 6A and 6B) opposite to the first direction. The gear structure 362 may be disposed closer to the first side surface 311a between the first side surface 311a and the second side surface 311b, and the elastic member (not shown) (e.g., the elastic member 330 of FIG. 7) may be disposed between the gear structure 362 and the second side surface 311b. For example, in the electronic device 101 without the elastic member 330, the gear structure 362 (e.g., the rack gear 364) may be disposed adjacent to the first side surface 311a of the first housing (e.g., the first plate 311), and when the first housing (e.g., the first plate 311) slidingly moves, the first housing (e.g., the first plate 311) may slidingly move, while tilted to the second housing (e.g., the second plate 321). According to various embodiments of the disclosure, the electronic device 101 may include the elastic member 330 at a position symmetrical to the gear structure 362, and the elastic member 330 may provide an elastic restoring force for the sliding movement to the first housing (e.g., the first plate 311). Accordingly, the first housing (e.g., the first plate 311) may slidingly move without tilting.

Figure 7:
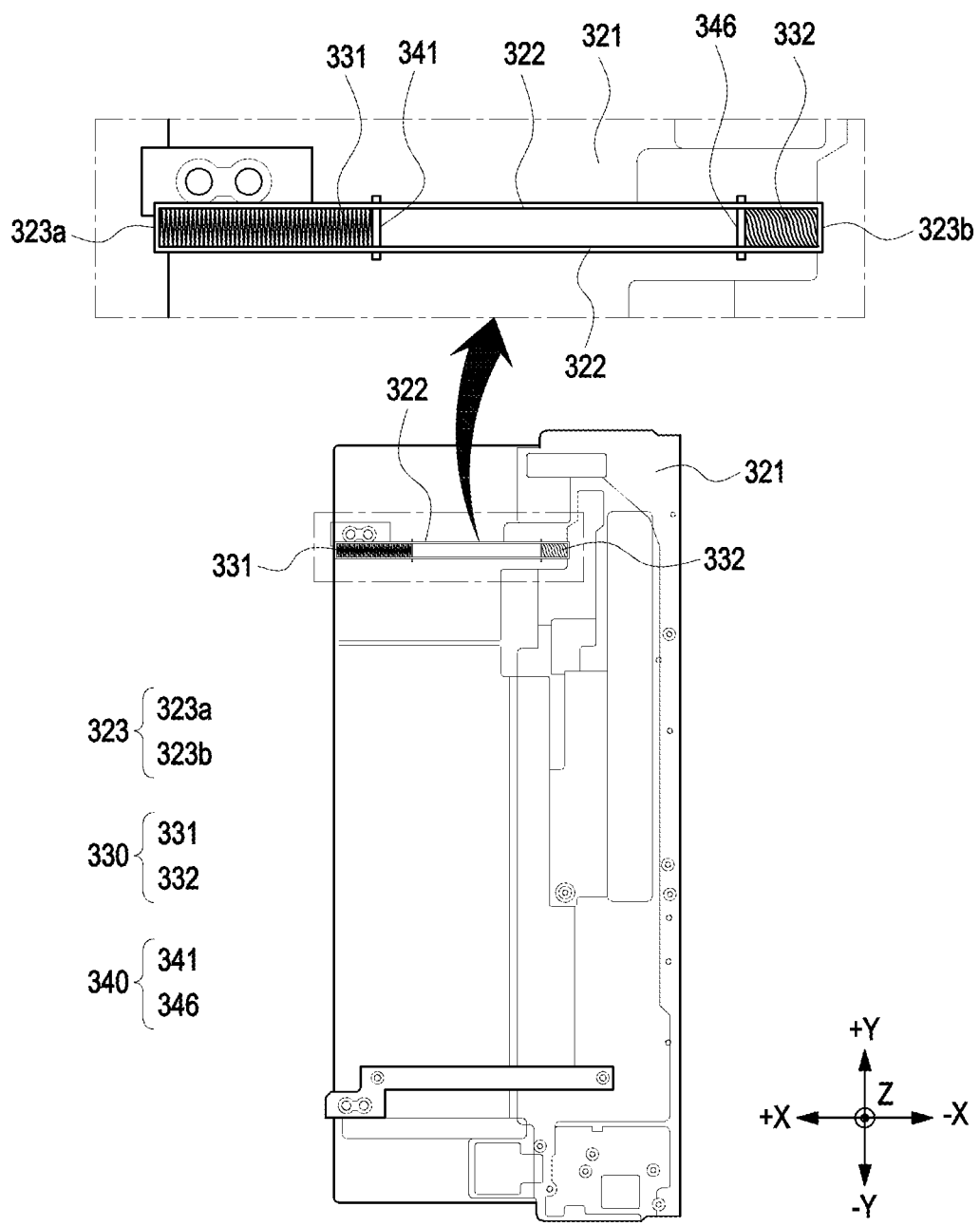
FIG. 7 is a diagram illustrating a front view of a second plate according to various embodiments.

FIG. 7 is a diagram illustrating a front view of a second plate according to various embodiments. For example, FIG. 7 may be a view viewed from the −Z direction to the +Z direction in FIG. 4.

Referring to FIG. 7, an electronic device (e.g., the electronic device 101 of FIGS. 1 to 5B) may include the second plate 321, the elastic member 330, and/or a guide wall 340.

The configuration of the second plate 321 and/or the elastic member 330 of FIG. 7 may be partially or wholly identical to that of the second plate 321 and/or the elastic member 330 of FIG. 5A and/or FIG. 5B.

According to various embodiments, the second plate 321 (e.g., the second plate 321 of FIGS. 5A and 5B) may include the second guide rail 322 and/or a support wall 323.

According to various embodiments, the second guide rail 322 may extend in the sliding movement direction (e.g., an X-axis direction in FIG. 7) of the first plate (not shown) (e.g., the first plate 311 of FIGS. 5A and 5B) on the second plate 321. According to an embodiment, a pair of second guide rails 322 may be provided, and disposed spaced apart from each other in the longitudinal direction (e.g., a Y-axis direction in FIG. 7) of the second plate 321. According to an embodiment, the pair of second guide rails 322 may be coupled with the second plate 321, and form a space in which the elastic member 330 may be disposed therebetween. According to an embodiment, when the first plate (not shown) (e.g., the first plate 311 of FIGS. 5A and 5B) and the second plate 321 are coupled with each other, the second guide rail 322 may be disposed in the accommodation groove (not shown) (e.g., the accommodation groove 316 of FIG. 6C) of the first plate (not shown) (e.g., the first plate 311 of FIGS. 5A and 5B).

According to various embodiments, the support wall 323 may be coupled with the second guide rail 322. According to an embodiment, the support wall 323 may include a first support wall 323a connecting one ends (e.g., ends facing the +X direction in FIG. 7) of a pair of second guide rails 322, and/or a second support wall 323b connecting the other ends (e.g., ends facing the −X direction in FIG. 7) of the pair of second guide rails 322.

According to various embodiments, the elastic member 330 may include the first elastic member 331 supported by the first support wall 323a and/or the second elastic member 332 supported by the second support wall 323b. According to an embodiment, the first elastic member 331 and/or the second elastic member 332 may include a spring. According to various embodiments, the first elastic member 331 and/or the second elastic member 332 may include various elastic members having an elastic restoring force. According to an embodiment, the elastic member 330 may be disposed in a space formed by the pair of second guide rails 322. According to an embodiment, when the first plate (not shown) (e.g., the first plate 311 of FIGS. 5A and 5B) and the second plate 321 are coupled with each other in the closed state (e.g., FIG. 5A), the first elastic member 331 may be disposed in the first accommodation groove (not shown) (e.g., the first accommodation groove 316a of FIG. 6C), and the second elastic member 332 may be disposed in the second accommodation groove (not shown) (e.g., the second accommodation groove 316b of FIG. 6C).

According to various embodiments, the guide wall 340 may include a first guide wall 341 coupled with and/or connected to the first elastic member 331 and/or a second guide wall 346 coupled with and/or connected to the second elastic member 332. According to an embodiment, the first guide wall 341 and/or the second guide wall 346 may slidingly move on the second guide rail 322. According to an embodiment, when the first plate (not shown) (e.g., the first plate 311 of FIGS. 5A and 5B) and the second plate 321 are coupled with each other, the first protrusion member (not shown) (e.g., the first protrusion member 315 of FIGS. 6A, 6B and 6C) of the first plate 311 (e.g., the first plate 311 of FIGS. 6A, 6B and 6C) may be disposed between the first guide wall 341 and the second guide wall 346.

Figure 8A:
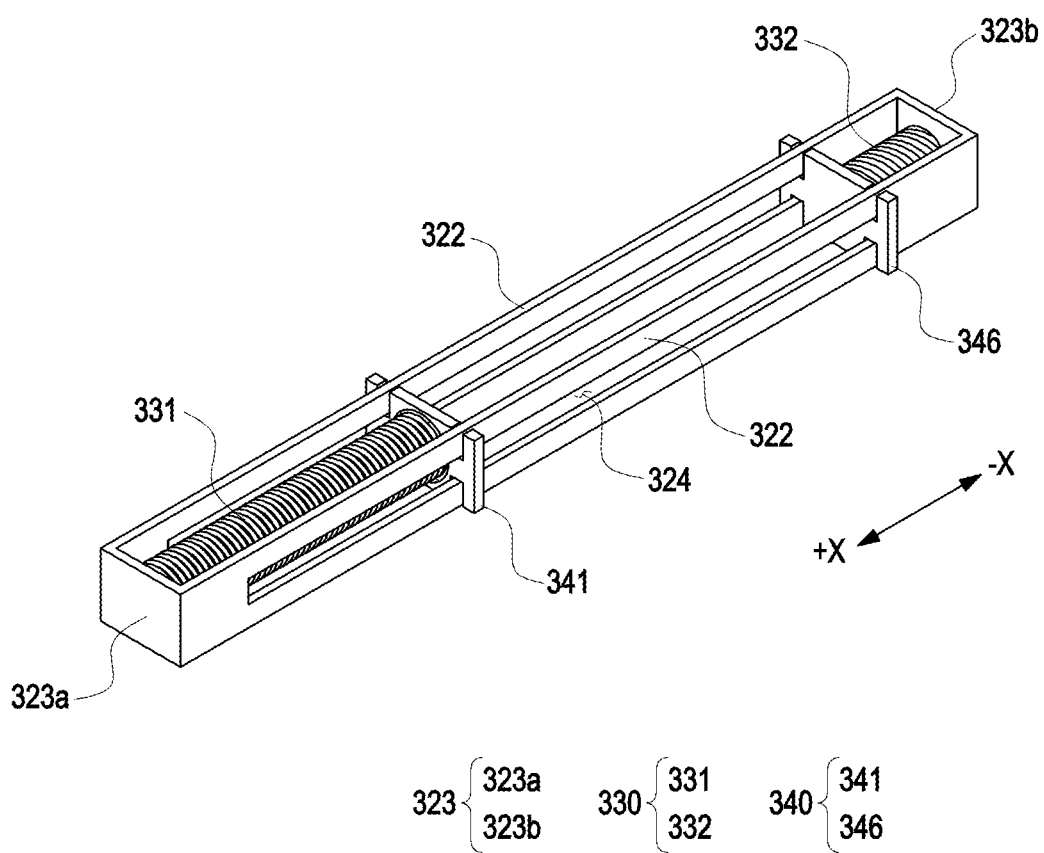
FIG. 8A is a combined perspective view illustrating a guide rail, an elastic member, and a guide wall according to various embodiments.
Figure 8B:
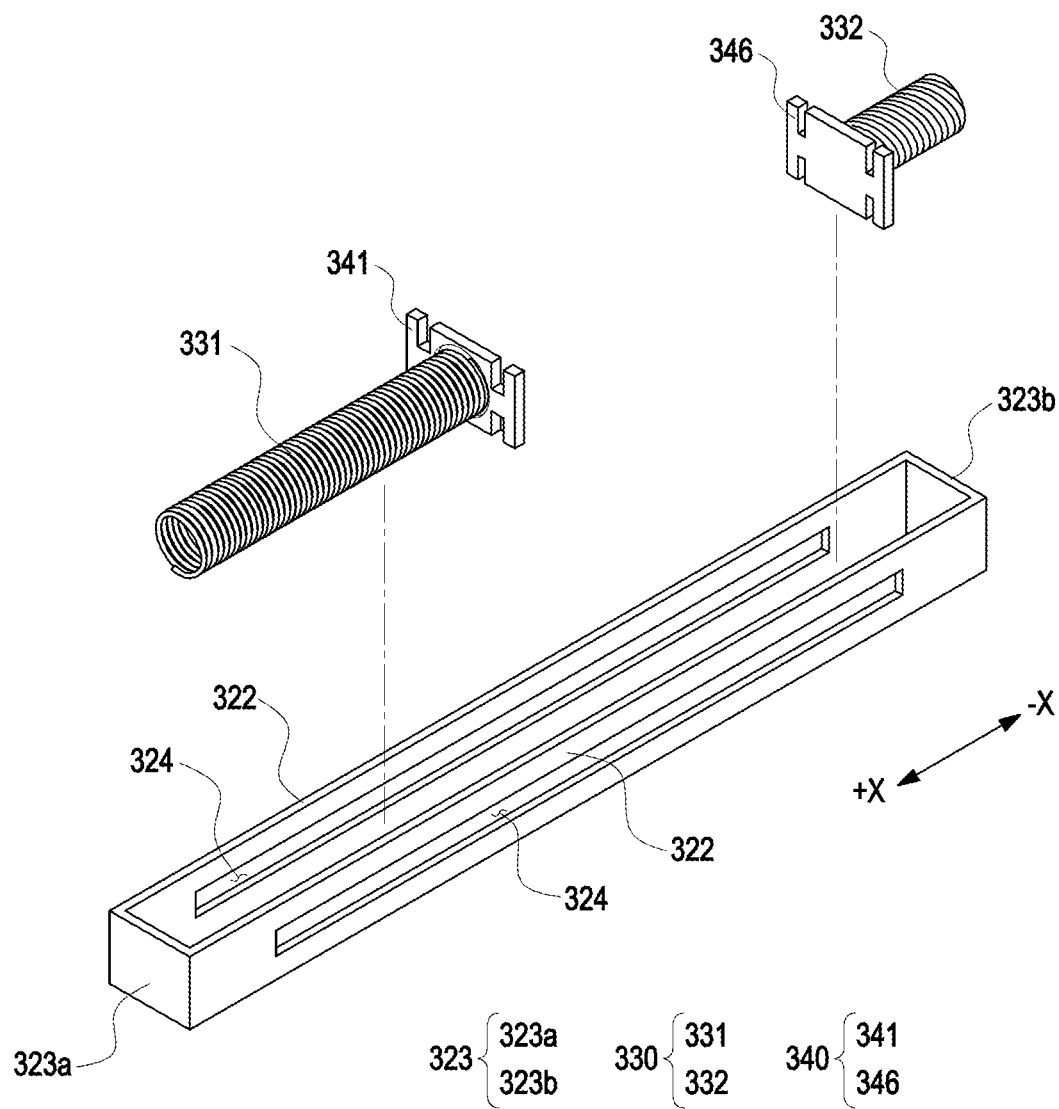
FIG. 8B is an exploded perspective view illustrating a guide rail, an elastic member, and a guide wall according to various embodiments.

FIG. 8A is a combined perspective view illustrating a guide rail, an elastic member, and a guide wall according to various embodiments. FIG. 8B is an exploded perspective view illustrating a guide rail, an elastic member, and a guide wall according to various embodiments.

Referring to FIG. 8A and/or FIG. 8B, an electronic device (e.g., the electronic device 101 of FIGS. 1 to 4) may include the second guide rail 322, the support wall 323, the elastic member 330, and/or or the guide wall 340.

The configuration of the second guide rail 322, the support wall 323, the elastic member 330, and/or the guide wall 340 of FIG. 8A and/or FIG. 8B may be partially or wholly identical to that of the second guide rail 322, the support wall 323, the elastic member 330, and/or the guide wall 340 of FIG. 7.

According to various embodiments, the second plate (not shown) (e.g., the second plate 321 of FIG. 7) may include the second guide rail 322 (e.g., the second guide rail 322 of FIG. 7) and/or or the support wall 323 (e.g., the support wall 323 of FIG. 7) coupled with the second guide rail 322.

According to an embodiment, each of a pair of second guide rails 322 may include a guide slit 324 extending along the sliding movement direction (e.g., FIG. 5A) of the first plate (not shown) (e.g., the first plate 311 of FIGS. 5A to 5B). According to an embodiment, the guide slit 324 may be shaped into a slit penetrating from one surface of the second guide rail 322 to the other surface thereof.

According to an embodiment, the support wall 323 may include the first support wall 323a (e.g., the first support wall 323a of FIG. 7) coupled with one ends of the pair of second guide rails 322, and the second support wall 323b (e.g., the second support wall 323b of FIG. 7) coupled with the other ends of the pair of second guide rails 322. According to an embodiment, the first support wall 323a may support the first elastic member 331 (e.g., the first elastic member 331 of FIG. 7), and the second support wall 323b may support the second elastic member 332 (e.g., the second elastic member 332 of FIG. 7).

According to an embodiment, the elastic member 330 (e.g., the elastic member 330 of FIG. 7) may include the first elastic member 331 and the second elastic member 332.

According to an embodiment, the guide wall 340 (e.g., the guide wall 340 of FIG. 7) may include the first guide wall 341 (e.g., the first guide wall 341 of FIG. 7) coupled with the first elastic member 331, and the second guide wall 346 (e.g., the second guide wall 346 of FIG. 7) coupled with the second elastic member 332.

According to an embodiment, the first elastic member 331 may have one end (e.g., the end facing the +X direction in FIG. 7) coupled with and/or connected to the first support wall 323a, and the other end (e.g., the end facing the −X direction in FIG. 7) coupled with and/or connected to the first guide wall 341. According to an embodiment, when the electronic device (e.g., the electronic device 101 of FIGS. 1 to 5B) is opened (e.g., the slide-out operation in FIG. 3 or FIG. 5B), the first guide wall 341 may be pressed in the first direction (e.g., a +X direction in FIGS. 8A and 8B) by the first protrusion member (not shown) (e.g., the first protrusion member 315 of FIG. 6C) of the first plate (not shown) (e.g., the first plate 311 of FIGS. 6A, 6B and 6C), and the first elastic member 331 may be compressed by being pressed in the first movement direction (e.g., the +X direction in FIGS. 8A and 8B) by the first guide wall 341. According to an embodiment, when the electronic device is closed (e.g., the slide-in operation in FIG. 2 or FIG. 5A), the first elastic member 331 may be elastically restored and press the first guide wall 341 in the second movement direction (e.g., a −X direction in FIGS. 8A and 8B), and the first protrusion member may slidingly move by being pressed by the first guide wall 341 in the second movement direction.

According to an embodiment, the second elastic member 332 may have one end (e.g., the end facing the −X direction in FIG. 7) coupled with and/or connected to the second support wall 323b, and the other end (e.g., the end facing the +X direction in FIG. 7) coupled with and/or connected to the second guide wall 346. According to an embodiment, when the electronic device (e.g., the electronic device 101 of FIGS. 1 to 5B) is closed (e.g., the slide-in operation in FIG. 2 or FIG. 5A), the second guide wall 346 may be pressed in the second direction (e.g., a −X direction in FIGS. 8A and 8B) by the first protrusion member (not shown) (e.g., the first protrusion member 315 of FIG. 6C) of the second plate (not shown) (e.g., the second plate 321 of FIGS. 6A, 6B and 6C), and the second elastic member 332 may be compressed by being pressed in the second movement direction (e.g., the −X direction in FIGS. 8A and 8B) by the second guide wall 346. According to an embodiment, when the electronic device is opened (e.g., the slide-out operation in FIG. 3 or FIG. 5B), the second elastic member 332 may be elastically restored and press the second guide wall 346 in the first direction (e.g., a +X direction in FIGS. 8A and 8B), and the first protrusion member may slidingly move by being pressed by the second guide wall 341 in the second direction.

Figure 9A:
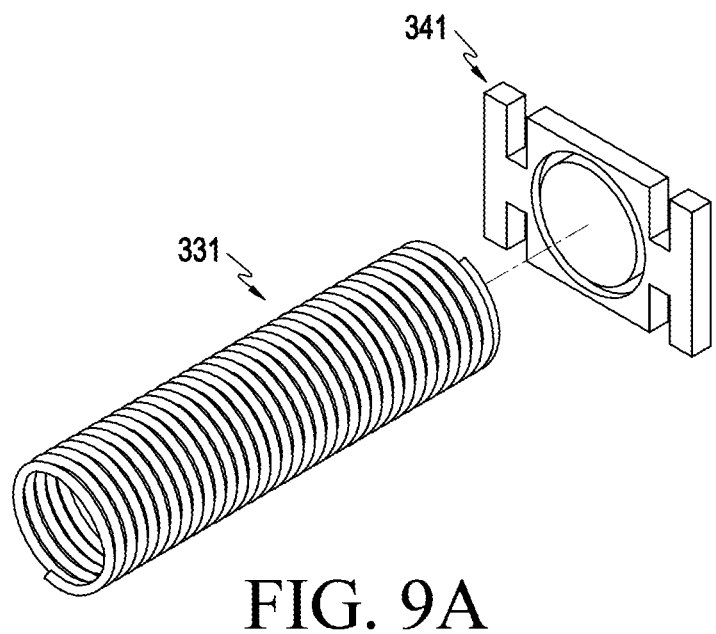
FIG. 9A is an exploded perspective view illustrating a guide wall and an elastic member according to various embodiments.
Figure 9B:
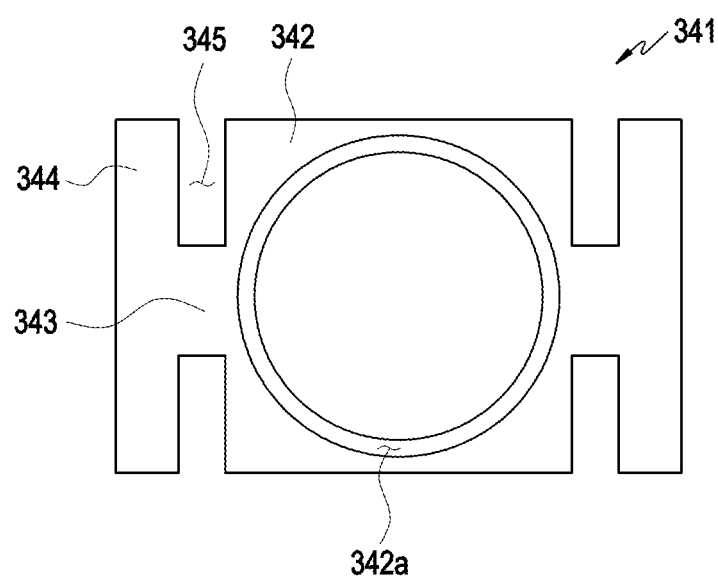
FIG. 9B is a diagram illustrating a guide wall according to various embodiments.

FIG. 9A is an exploded perspective view illustrating a guide wall and an elastic member according to various embodiments. FIG. 9B is a diagram illustrating a guide wall according to various embodiments. While FIGS. 9A and/or 9B illustrate the first guide wall 341 and the first elastic member 331 by way of example for convenience of description, a description of the first guide wall 341 and the first elastic member 331 may be equally applied to the second guide wall (not shown) (e.g., the second guide wall 346 of FIGS. 7, 8A and 8B) and the second elastic member 332 (e.g., the second elastic member 332 of FIGS. 7, 8A and 8B).

Referring to FIG. 9A and/or FIG. 9B, an electronic device (e.g., the electronic device 101 of FIGS. 1 to 4) may include the first guide wall 341 and the first elastic member 331.

The configuration of the first guide wall 341 and/or the first elastic member 331 of FIGS. 9A and/or 9B may be partially or wholly identical to that of the first guide wall 341 and/or the first elastic member 331 of FIGS. 7, 8A and 8B.

According to various embodiments, the first guide wall 341 (e.g., the first guide wall 341 of FIGS. 7, 8A and 8B) may include a first coupling member 342, a first connecting member 343, a first wing member 344, and a first guide groove 345.

According to an embodiment, the first coupling member 342 may include a first coupling groove 342a which is at least partially recessed. According to an embodiment, the first coupling groove 342a may be in the shape of a groove recessed in at least part of the first coupling member 342. According to an embodiment, one end of the first elastic member 331 may be coupled with and/or connected to the first coupling groove 342a. According to an embodiment, the first elastic member 331 may be coupled with the first coupling groove 342a by an attachment member, press-fitted into the first coupling groove 342a, or welded to the first coupling groove 342a. According to an embodiment, the first coupling groove 342a may be in the shape of a circle to correspond to the shape of the first elastic member 331. However, the first coupling groove 342a may be in various shapes, not limited to the circle. According to an embodiment, the first coupling member 342 may be pressed by the first protrusion member (not shown) (e.g., the first protrusion member 315 of FIGS. 6A, 6B and 6C) of the first plate (not shown) (e.g., the first plate 311 of FIGS. 6A, 6B and 6C). According to an embodiment, the first coupling member 342 may be disposed in a space formed between a pair of second guide rails (not shown) (e.g., the pair of second guide rails 322 of FIGS. 8A and 8B).

According to an embodiment, the first connecting member 343 may be a member connecting the first coupling member 342 to the first wing member 344. According to an embodiment, a pair of first connecting members 343 may be provided, which are connected to one side and the other side of the first coupling member 342, respectively. According to an embodiment, the first connecting member 343 may be disposed in the guide slit (not shown) formed in the second guide rail (not shown) (e.g., the second guide rail 322 of FIGS. 8A and 8B).

According to an embodiment, the first wing member 344 may be coupled in an outer direction (e.g., a +Y direction in FIG. 9B or a -Y direction in FIG. 9B) of the first connecting member 343. According to an embodiment, the height of the first wing member 344 (e.g., a length in the Z-axis direction in FIG. 9B) may be greater than the height of the first connecting member 343 (e.g., a length in the Z-axis direction in FIG. 9B). According to an embodiment, a pair of first wing members 344 may be provided, which are coupled with the pair of first connecting members 343, respectively. According to an embodiment, the first wing member 344 may be disposed outside the second guide rail (not shown) (e.g., the second guide rail 322 of FIGS. 8A and 8B).

According to an embodiment, the first guide wall 341 may include the first guide groove 345 which is at least partially recessed. According to an embodiment, the first guide groove 345 may be in the shape of a groove into which at least part of the first guide wall 341 is recessed. According to an embodiment, the first guide groove 345 may be a space surrounded by the first coupling member 342, the first connecting member 343, and the first wing member 344. According to an embodiment, a plurality of first guide grooves 345 may be provided. According to an embodiment, when the first connecting member 343 is disposed in the guide slit (not shown) (e.g., the guide slit 324 of FIGS. 8A and 8B), the plurality of first guide grooves 345 may have portions of the second guide rail (not shown) (e.g., the second guide rail 322 of FIGS. 8A and 8B) with no guide slit disposed therein.

In an embodiment, the first coupling member 342, the first coupling member 343, and/or the first wing member 344 may be formed as a separate member, and the first guide wall 341 may be prepared by coupling or assembling these members. In an embodiment, the first coupling member 342, the first connecting member 343, and/or the first wing member 344 may be formed as a single member, and the first guide wall 341 may be prepared by processing the first guide groove 345 and/or the first coupling groove 342a in the single member.

Figure 10:
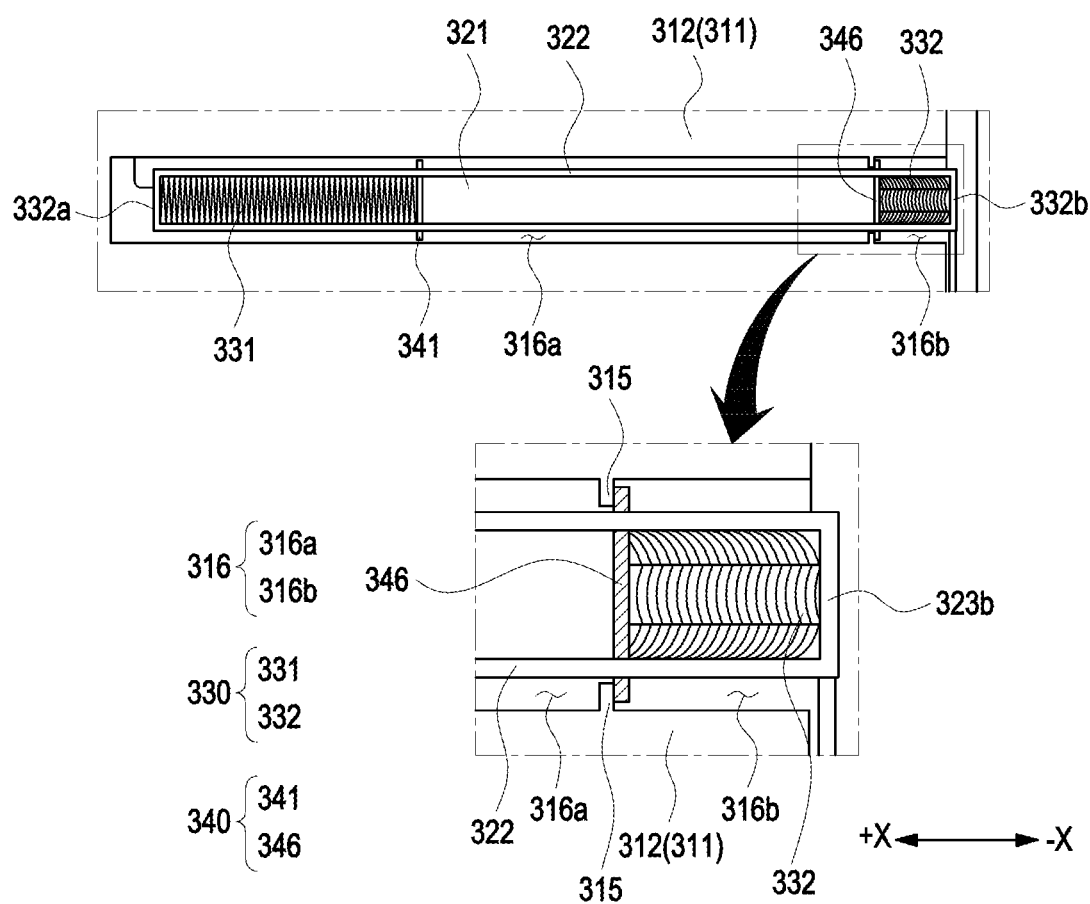
FIG. 10 is a cross-sectional view illustrating a first plate and a second plate according to various embodiments.

FIG. 10 is a cross-sectional view illustrating a first plate and a second plate according to various embodiments. For example, FIG. 10 illustrates a state in which a guide rail formed in the second plate is disposed in an accommodation groove formed in the first plate.

Referring to FIG. 10, an electronic device (e.g., the electronic device 101 of FIGS. 1 to 5B) may include the first plate 311, the second plate 321, the elastic member 330, and/or the guide wall 340.

The configuration of the first plate 311 of FIG. 10 may be partially or wholly identical to that of the first plate 311 of FIGS. 6A, 6B and/or 6C. The configuration of the second plate 321, the elastic member 330, and/or the guide wall 340 of FIG. 10 may be partially or wholly identical to that of the second plate 321, the elastic member 330, and the guide wall 340 of FIGS. 7, 8A and/or 8B.

According to various embodiments, the first plate 311 (e.g., the first plate 311 of FIGS. 6A, 6B and 6C) may include the $(1-1)^{th}$ plate area 312 (e.g., the $(1-1)^{th}$ plate area 312 of FIGS. 6A, 6B and 6C). According to an embodiment, the first plate 311 may include the accommodation groove 316 (e.g., the accommodation groove 316 in FIG. 6C) into which at least part of the $(1-1)^{th}$ plate area 312 (e.g., the $(1-1)^{th}$ plate area of FIGS. 6A, 6B and 6C) is recessed. According to an embodiment, the first plate 311 may include the first protrusion member 315 (e.g., the first protrusion member 315 of FIG. 6C) protruding from the accommodation groove 316.

According to various embodiments, the second plate 321 (e.g., the second plate 321 of FIGS. 7, 8A and 8B) may include the second guide rail 322 (e.g., the second guide rail 322 of FIGS. 7, 8A and 8B), the guide slit 324 (e.g., the guide slit 324 of FIGS. 8A and 8B) formed in the second guide rail 322, and the support wall 323 (e.g., the support wall 323 of FIGS. 7, 8A and 8B) coupled with the second guide rail 322. According to an embodiment, the support wall 323 may include the first support wall 323a (e.g., the first support wall 323a of FIGS. 7, 8A and 8B) and the second support wall 323b (e.g., the second support wall 323b of FIGS. 7, 8A and 8B).

According to various embodiments, the elastic member 330 (e.g., the elastic member 330 of FIGS. 7, 8A and 8B) may include the first elastic member 331 (e.g., the first elastic member 331 of FIGS. 7, 8A and 8B) having one end coupled with the first support wall 323a, and the second elastic member 332 (e.g., the second elastic member 332 of FIGS. 7, 8A and 8B) having one end coupled with the second support wall 323b.

According to various embodiments, the guide wall 340 (e.g., the guide wall 340 of FIGS. 7, 8A and 8B) may include the first guide wall 341 (e.g., the first guide wall 341 FIGS. 7, 8A and 8B) coupled with the other end of the first elastic member 331, and the second guide wall 346 (e.g., the second guide wall 346 of FIGS. 7, 8A and 8B) coupled with the other end of the second elastic member 332.

According to an embodiment, when the electronic device is closed (e.g., the slide-in operation in FIG. 2 or FIG. 5A), the first plate 311 may slidingly move in the second movement direction (e.g., a -X direction in FIG. 10), and the first protrusion member 315 formed on the first plate 311 may press the second guide wall 346 in the second movement direction. Accordingly, the second guide wall 346 may slidingly move on the second guide rail 322 in the second movement direction, and press the second elastic member 332 in the second movement direction. At this time, the second elastic member 332 supported by the second support wall 332b may be compressed by being pressed by the second guide wall 346.

According to an embodiment, when the electronic device is opened from the closed state (e.g., the slide-out operation in FIG. 3 or FIG. 5B), the second elastic member 332 may be elastically restored and press the second guide wall 346 in the first movement direction (e.g., a +X direction in FIG. 10). The second guide wall 346 pressed by the second elastic member 332 may slidingly move in the first movement direction and press the first protrusion member 315 in the first movement direction. While not shown, the first plate 311 may slidingly move in the first movement direction (e.g., the +X direction in FIG. 10), and the first protrusion member 315 formed on the first plate 311 may press the first guide wall 341 in the first movement direction. Accordingly, the first guide wall 341 may slidingly move in the first movement direction on the second guide rail 322 and press the first elastic member 331 in the first movement direction. At this time, the first elastic member 331 supported by the first support wall 323a may be compressed by being pressed by the first guide wall 341.

While not shown, when the electronic device is closed from the open state (e.g., the slide-in operation in FIG. 2 or FIG. 5A), the first elastic member 331 may be elastically restored and press the first guide wall 341 in the second movement direction (e.g., the −X direction in FIG. 10). The first guide wall 341 pressed by the first elastic member 331 may slidingly move in the second movement direction and press the first protrusion member 315 in the second movement direction.

Figure 11A:
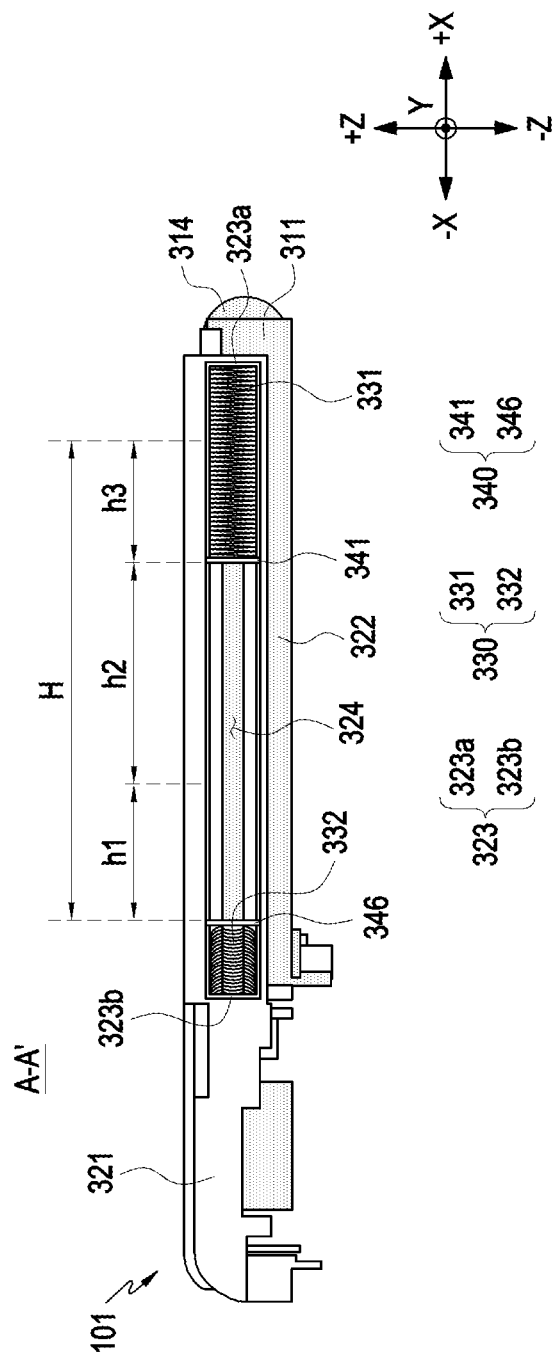
FIG. 11A is a cross-sectional view taken along line A-A' of FIG. 5A according to various embodiments.
Figure 11B:
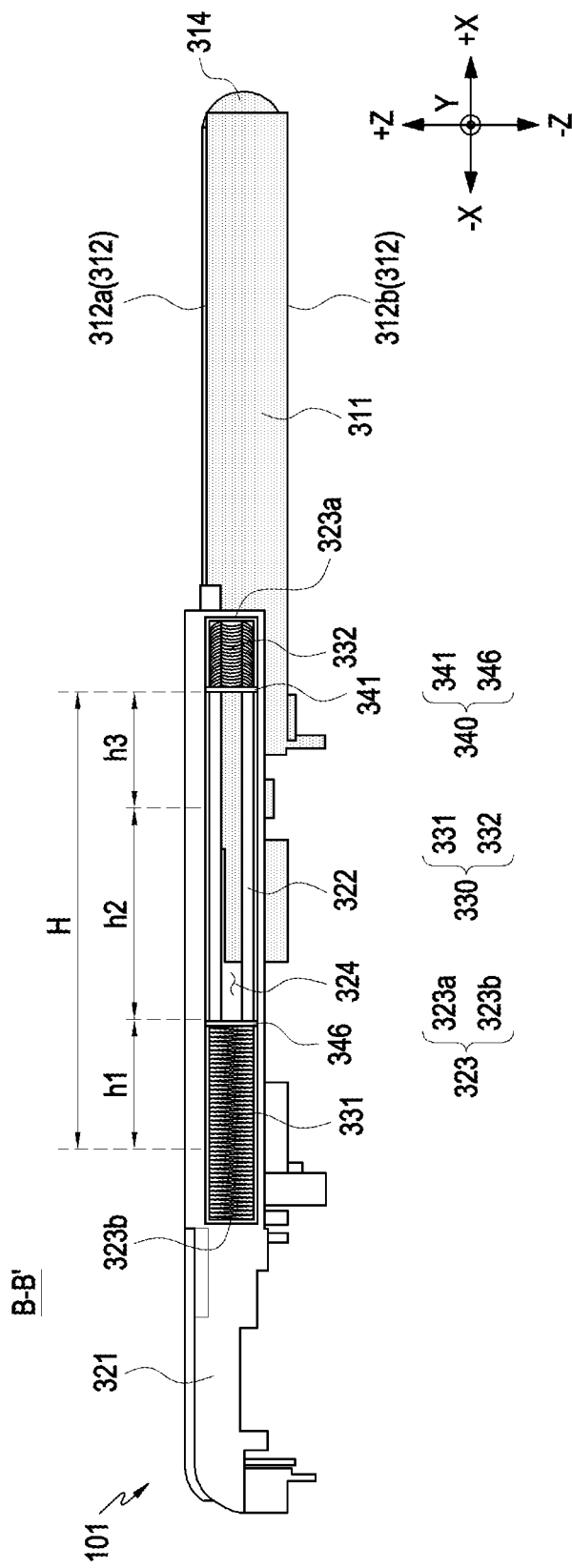
FIG. 11B is a cross-sectional view taken along line B-B' of FIG. 5B according to various embodiments.

FIG. 11A is a cross-sectional view taken along line A-A' of FIG. 5A according to various embodiments. FIG. 11B is a cross-sectional view taken along line B-B' of FIG. 5B according to various embodiments. For example, FIG. 11A is a cross-sectional view illustrating an arrangement relationship between a first plate and a second plate in a closed state of an electronic device, and FIG. 11B is a cross-sectional view illustrating an arrangement relationship of the first plate and the second plate in an open state of the electronic device.

Referring to FIG. 11A and/or FIG. 11B, the electronic device 101 (e.g., the electronic device 101 of FIGS. 1 to 5B) may include the first plate 311, the second plate 321, the elastic member 330, and/or the guide wall 340.

The configurations of the first plate 311 and the second plate 321 of FIGS. 11A and 11B may be partially or wholly identical to those of the first plate 311 and the second plate 321 of FIGS. 5A and 5B and/or those of the first plate 311 and the second plate 321 of FIG. 10. The configurations of the elastic member 330 and the guide wall 340 of FIGS. 11A and 11B may be partially or wholly identical to those of the elastic member 330 and the guide wall 340 of FIGS. 7 to 10.

According to various embodiments, the first plate 311 (e.g., the first plate 311 of FIGS. 5A and 5B) may include the $(1-1)^{th}$ plate area 312 (e.g., the $(1-1)^{th}$ plate area 312 of FIGS. 5A and 5B) including the first surface 312a (e.g., the first surface 312a of FIGS. 5A, 5B and 6A) and the second surface 312b (e.g., the second surface 312b of FIGS. 6B and 6C).

According to an embodiment, when the electronic device 101 is in the closed state (e.g., the slide-in operation in FIG. 2 or FIG. 11A), the first surface 312a of the $(1-1)^{th}$ plate area 312 may face the cover member (not shown) (e.g., the cover member 222 of FIG. 4) or the rear plate (not shown) (e.g., the rear plate 223 of FIG. 4). According to an embodiment, the second surface 312b of the $(1-1)^{th}$ plate area 312 may support at least part of the display (not shown) (e.g., the display 203 of FIG. 4). According to an embodiment, the first plate 311 (e.g., the $(1-1)^{th}$ plate area 312) has a curved surface 314 (e.g., the curved surface 250 of FIG. 4) which is at least partially curved. According to an embodiment, the multi-bar structure (not shown) (e.g., the multi-bar structure 213 of FIG. 4) may move in response to the curved surface 314 located at an edge of the first plate 311.

According to an embodiment, the second plate 321 (e.g., the second plate 321 of FIGS. 5A to 5B) may include the second guide rail 322 (e.g., the second guide rails 322 of FIGS. 8A and 8B) having the guide slit 324 (e.g., the guide slit 324 of FIGS. 8A and 8B) formed thereon, and the support wall 323 (e.g., the support wall 323 of FIGS. 8A and 8B) coupled with the second guide rail 322. According to an embodiment, at least part of the second plate 321 (e.g., at least part of a flat surface of the second plate 321 facing the +Z direction in FIGS. 11A and 11B) may support at least part of the display (not shown) (e.g., the display 203 of FIG. 4).

According to an embodiment, the second guide rail 322 may extend in the sliding movement direction (e.g., the X-axis direction of FIGS. 11A and 11B) of the first plate 311, and the guide slit 324 may be formed along the sliding movement direction of the first plate 311 on the guide rail 322. According to an embodiment, a pair of second guide rails 322 may be provided, and form a space therebetween, in which the elastic member 330 (e.g., the elastic member 330 of FIGS. 8A and 8B) may be disposed.

According to an embodiment, the support wall 323 (e.g., the support wall 323 of FIGS. 8A and 8B) may include the first support wall 323a coupled with one side of the second guide rail 322 and supporting the first elastic member 331 (e.g., the first elastic member 331 of FIGS. 8A and 8B), and the second support wall 323b coupled with the other side of the second guide rail 322 and supporting the second elastic member 332 (e.g., the second elastic member 332 of FIGS. 8A and 8B).

According to an embodiment, the elastic member 330 (e.g., the elastic member 330 of FIGS. 8A and 8B) may include the first elastic member 331 connected to the first support wall 323a and the first guide wall 341 (e.g. the first guide wall 341 of FIGS. 8A and 8B), and the second elastic member 332 connected to the second support wall 323b and the second guide wall 346 (e.g., the second guide wall 346 of FIGS. 8A and 8B). According to an embodiment, when the electronic device 101 is opened (e.g., the slide-out operation), the first elastic member 331 may be compressed, whereas when the electronic device 101 is closed (e.g., the slide-in operation), the second elastic member 332 may be compressed.

According to an embodiment, the guide wall 340 (e.g., the guide wall 340 of FIGS. 8A and 8B) may include the first guide wall 341 with which the first elastic member 331 is coupled, and the second guide wall 346 with which the second elastic member is coupled. According to an embodiment, when the electronic device 101 is opened (e.g., the slide-out operation), the first guide wall 341 may be pressed by the first protrusion member (not shown) (e.g., the first protrusion member 315 of FIG. 6C) of the first plate 311, and when the electronic device 101 is closed (e.g., the slide-in operation), the second guide wall 346 may be pressed by the first protrusion member of the first plate 311.

With reference to FIGS. 11A and 11B, an operation of the electronic device 101 when the electronic device 101 switches from the closed state (e.g., FIG. 2 or FIG. 11A) to the open state (e.g., FIG. 3 or 11B) will be described below.

According to an embodiment, when the electronic device 101 switches from a fully closed state (e.g., FIG. 2 or FIG. 11A) to a fully open state (e.g., FIG. 3 or 11B), the first plate 311 may slidingly move on the second plate 321 by a first slide length H in the first movement direction (e.g., the +X direction of FIGS. 11A and 11B). According to an embodiment, the first slide length H may include a $(1-1)^{th}$ slide length h1, a $(1-2)^{th}$ slide length h2, and a $(1-3)^{th}$ slide length h3. According to an embodiment, the $(1-1)^{th}$ slide length h1 may be a length value obtained by subtracting a minimum compressed length of the second elastic member 332 from a maximum uncompressed length of the second elastic member 332, and the (1-3)$^{th}$ slide length h3 may be a length value obtained by subtracting a minimum compressed length of the first elastic member 331 from a maximum uncompressed length of the first elastic member 331.

According to an embodiment, in the fully closed state (e.g., FIG. 2 or FIG. 11A) of the electronic device 101, the second guide wall 346 may be pressed in the second movement direction (e.g., the −X direction in FIG. 11A) by the first protrusion member (not shown) of the first plate 311 and press the second elastic member 332 in the second movement direction (e.g., the −X direction in FIG. 11A), and the second elastic member 332 may be compressed, while being supported by the second support wall 323b.

According to an embodiment, when the electronic device 101 moves from the closed state (e.g., FIG. 2 or FIG. 11A) to the open state (e.g., FIG. 3 or FIG. 11B), the driver (not shown) (e.g., the driver 360 of FIGS. 5A and 5B) may provide a driving force to the first plate 311 so that the first plate 311 may move in the first movement direction (e.g., the +X direction of FIGS. 11A and 11B). According to an embodiment, the second elastic member 332 may be elastically restored and press the second guide wall 346, and the second guide wall 346 may press the first protrusion member (not shown) of the first plate 311, while sliding in the first movement direction (e.g., the +X direction of FIGS. 11A and 11B) by the (1-1)$^{th}$ slide length h1. For example, the first plate 311 may slidingly move in the first movement direction (e.g., the +X direction in FIGS. 11A and 11B) in a section of the (1-1)$^{th}$ slide length h1 under simultaneous action of the elastic restoring force of the second elastic member 332 and the driving force of the driver (not shown)).

According to an embodiment, when the electronic device 101 moves to the open state (e.g., FIG. 3 or FIG. 11B), the first plate 311 may slidingly move in the first movement direction (e.g., the +X direction in FIGS. 11A and 11B) in a section of the (1-2)$^{th}$ slide length h2 under the action of the driving force of the driver (not shown)).

According to an embodiment, when the electronic device 101 passes the section of the (1-2)$^{th}$ slide length h2 and then enters the section of the (1-3)$^{th}$ slide length h3, the first protrusion member (not shown) of the first plate 311 may press the first guide wall 341 in the first movement direction (e.g., the +X direction in FIGS. 11A and 11B), and the first guide wall 341 may press the first elastic member 331 in the first movement direction, while slidingly moving in the first movement direction. At this time, the first elastic member 331 may be compressed by being pressed in the first movement direction (e.g., the +X direction of FIGS. 11A and 11B) by the first guide wall 341.

According to an embodiment, when the electronic device 101 is in the fully open state (e.g., FIG. 3 or FIG. 11B), the first elastic member 331 may be compressed by the (1-3)$^{th}$ slide length h3.

With reference to FIGS. 11A and 11B, when the electronic device 101 switches from the open state (e.g., FIG. 3 or FIG. 11B) to the closed state (e.g., FIG. 2 or FIG. 11A), an operation of the electronic device will be described.

According to an embodiment, when the electronic device 101 switches from the fully open state (e.g., FIG. 3 or FIG. 11B) to the fully closed state (e.g., FIG. 2 or FIG. 11A), the first plate 311 may slidingly move on the second plate 321 by the first slide length H in the second movement direction (e.g., the −X direction in FIGS. 11A and 11B). According to an embodiment, the first slide length H may include the (1-1)$^{th}$ slide length h1, the (1-2)$^{th}$ slide length h2, and the (1-3)$^{th}$ slide length h3. According to an embodiment, the (1-1)$^{th}$ slide length h1 may be the length value obtained by subtracting the minimum compressed length of the second elastic member 332 from the maximum uncompressed length of the second elastic member 332, and the (1-3)$^{th}$ slide length h3 may be the length value obtained by subtracting the minimum compressed length of the first elastic member 331 from the maximum uncompressed length of the first elastic member 331.

According to an embodiment, in the fully open state (e.g., FIG. 3 or FIG. 11B) of the electronic device 101, the first guide wall 341 may be pressed in the first movement direction (e.g., the +X direction in FIG. 11A) by the first protrusion member (not shown) of the first plate 311 and press the first elastic member 331 in the first movement direction (e.g., the +X direction in FIG. 11A), and the first elastic member 331 may be compressed, while being supported by the first support wall 323a.

According to an embodiment, when the electronic device 101 moves from the open state (e.g., FIG. 3 or FIG. 11B) to the closed state (e.g., FIG. 2 or FIG. 11A), the driver (not shown) (e.g., the driver 360 of FIGS. 5A and 5B) may provide a driving force to the first plate 311 so that the first plate 311 may move in the second movement direction (e.g., the −X direction of FIGS. 11A and 11B). According to an embodiment, the first elastic member 331 may be elastically restored and press the first guide wall 341, and the first guide wall 341 may press the first protrusion member (not shown) of the first plate 311, while slidingly moving in the second movement direction (e.g., the +X direction of FIGS. 11A and 11B) by the (1-3)$^{th}$ slide length h3. For example, the first plate 311 may slidingly move in the second movement direction (e.g., the −X direction in FIGS. 11A and 11B) in the section of the (1-3)$^{th}$ slide length h3 under simultaneous action of the elastic restoring force of the first elastic member 331 and the driving force of the driver (not shown)).

According to an embodiment, when the electronic device 101 moves to the closed state (e.g., FIG. 2 or FIG. 11A), the first plate 311 may slidingly move in the second movement direction (e.g., the −X direction in FIGS. 11A and 11B) in the section of the (1-2)$^{th}$ slide length h2 under the action of the driving force of the driver (not shown)).

According to an embodiment, when the electronic device 101 passes the section of the (1-2)$^{th}$ slide length h2 and then enters the section of the (1-1)$^{th}$ slide length h1, the first protrusion member (not shown) of the first plate 311 may press the second guide wall 346 in the second movement direction (e.g., the −X direction in FIGS. 11A and 11B), and the second guide wall 346 may press the second elastic member 332 in the second movement direction, while slidingly moving in the second movement direction. At this time, the second elastic member 332 may be compressed by being pressed in the second movement direction (e.g., the +X direction of FIGS. 11A and 11B) by the second guide wall 346.

According to an embodiment, when the electronic device 101 is in the fully closed state (e.g., FIG. 2 or FIG. 11A), the second elastic member 332 may be compressed by the (1-1)$^{th}$ slide length h1.

Figure 12:
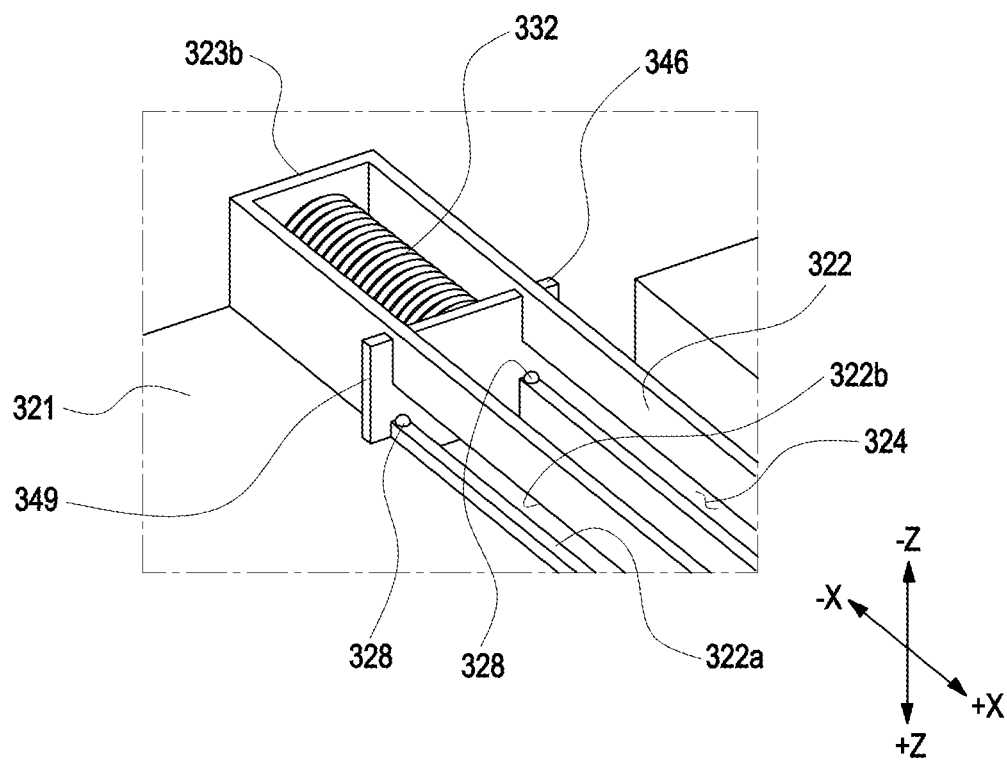
FIG. 12 is a partial perspective view illustrating a guide rail and an elastic member according to various embodiments.

FIG. 12 is a partial perspective view illustrating a guide rail and an elastic member according to various embodiments.

Referring to FIG. 12, an electronic device (e.g., the electronic device 101 of FIGS. 1 to 4) may include the second plate 321, the second elastic member 332, and/or the second guide wall 346.

The configuration of the second plate 321, the second elastic member 332, and/or the second guide wall 346 of FIG. 12 may be partially or wholly identical to that of the second plate 321, the second elastic member 332, and/or the second guide wall 346 of FIGS. 8A and 8B.

According to various embodiments, the second plate 321 (e.g., the second plate 321 of FIGS. 8A and 8B) may include the second guide rail 322 (e.g., the second guide rail 322 of FIGS. 8Aa and 8B), the second support wall 323b (e.g., the second support wall 323b of FIGS. 8A and 8B), and/or the guide slit 324 (e.g. the guide slit 324 in FIGS. 8A and 8B).

According to an embodiment, the second plate 321 may further include a second protrusion member 328 formed in the guide slit 324. According to an embodiment, the second protrusion member 328 may be formed on at least one of a first portion 322a of the second guide rail 322, which forms the bottom of the guide slit 324 or a second portion 322b of the second guide rail 322, which forms the ceiling of the guide slit 324. While the second protrusion member 328 is shown as formed only on the first portion 322a in the illustrated embodiment (FIG. 12), the second protrusion member 328 may be formed only on the second portion 322b or on both of the first portion 322a and the second portion 322b. According to an embodiment, the second protrusion member 328 may be shaped into, but not limited to, a hemisphere. The second protrusion member 328 may be formed in various shapes. According to an embodiment, the second protrusion member 328 may be formed of, but not limited to, an elastic material including a urethane material. The second protrusion member 328 may be formed of various elastically deformable materials.

According to an embodiment, the second elastic member 332 (e.g., the second elastic member 332 of FIGS. 8A and 8B) may be supported by the second support wall 323b and coupled with the second guide wall 346 (e.g., the second guide wall 346 of FIGS. 8A and 8B).

According to an embodiment, when the first plate (not shown) (e.g., the first plate 311 of FIGS. 5A and 5B) moves in the second movement direction (e.g., a —X direction in FIG. 12), the second guide wall 346 may slidingly move in the second movement direction, with a second wing member 349 (e.g., the wing member 344 of FIG. 9B) of the second guide wall 346 being pressed by the first protrusion member (not shown) (e.g., the first protrusion member 315 of FIG. 6C) of the first plate (not shown).

According to an embodiment, when the second guide wall 346 crosses a portion of the guide slit 324 in which the second protrusion member 328 is formed, the second guide wall 346 may slidingly move in the second movement direction, while the second protrusion member 328 is elastically deformed.

According to an embodiment, in the fully open state (e.g., FIG. 3 or FIG. 5B) of the electronic device (e.g., the electronic device 101 of FIGS. 1 to 4), the second elastic member 332 is in a compressed state. Therefore, the second elastic member 332 may apply an elastic restoring force to the second guide wall 346 in the first movement direction (e.g., the +X direction in FIG. 12). In this case, the motor (not shown) (e.g., the motor 361 of FIGS. 5A and 5B) has a back drive force (e.g., a force required to rotate an internal reduction gear, when the motor stops). Therefore, even when the second guide wall 346 presses the first protrusion member (not shown) of the first plate (not shown), movement of the first plate in the first movement direction may be restricted. According to an embodiment, a force that the second guide wall 346 applies to the first protrusion member (not shown) of the first plate (not shown) may be reduced in view of the formation of the second protrusion member 328 in the electronic device (e.g., the electronic device 101 of FIGS. 1 to 4). For example, in the open state of the electronic device (e.g., the electronic device 101 of FIGS. 1 to 4), the elastic restoring force of the second elastic member 332 may be counterbalanced by the frictional force of the second protrusion member 328 acting on the second guide wall 346 and the back drive force acting on the motor (not shown). For example, when the electronic device (e.g., the electronic device 101 of FIGS. 1 to 4) moves to the closed state, the first plate (not shown) may slidingly move in the second movement direction (e.g., the +X direction in FIG. 12). At this time, the second guide wall 346 may be instantaneously spaced apart from the first protrusion member (not shown) of the first plate (not shown), and cross over the second elastic member 332, overcoming the frictional force of the second protrusion member 328 through the elastic restoring force of the second protrusion member 328. In this case, the second guide wall 346 may contact the first protrusion member (not shown) of the first plate (not shown) again and press the first protrusion member in the first movement direction.

While not shown, the electronic device (e.g., the electronic device 101 of FIGS. 1 to 4) may include a third protrusion member (not shown) at a portion of the guide slit 324, adjacent to the first elastic member (not shown) (e.g., the first elastic member 331 of FIGS. 8A and 8B). The description of the second protrusion member may be equally applied to the third protrusion member.

Figure 13:
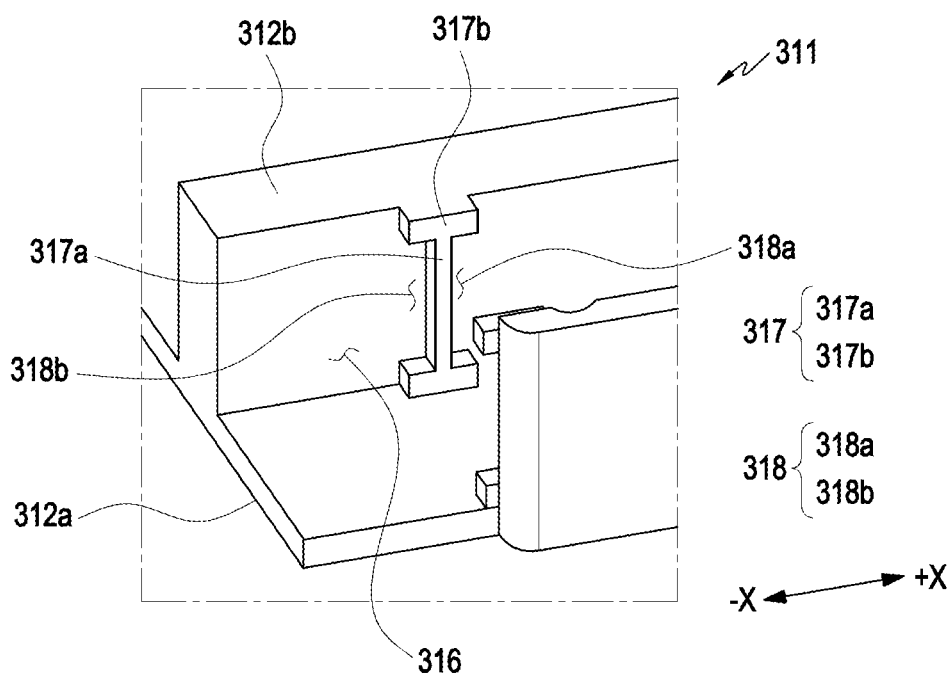
FIG. 13 is a partial perspective view illustrating a partial area of a first plate according to various embodiments.

FIG. 13 is a partial perspective view illustrating a partial area of a first plate according to various embodiments.

Referring to FIG. 13, an electronic device (e.g., the electronic device 101 of FIGS. 1 to 4) may include the first plate 311 including the $(1-1)^{th}$ plate area 312 and a first protrusion member 317.

The configurations of the first plate 311 and the $(1-1)^{th}$ plate area 312 of FIG. 13 may be partially or wholly identical to those of the first plate 311 and the $(1-1)^{th}$ plate area 312 of FIGS. 6A, 6B and 6C.

According to various embodiments, the $(1-1)^{th}$ plate area 312 (e.g., the $(1-1)^{th}$ plate area 312 of FIGS. 6A, 6B and 6C) may have the first surface 312a (e.g., the first surface 312a of FIGS. 6A, 6B and 6C), and the second surface 312b (e.g., the second surface 312b of FIGS. 6A, 6B and 6C) facing the direction opposite to the first surface 312a.

According to an embodiment, the $(1-1)^{th}$ plate area 312 may include the accommodation groove 316 (e.g., the accommodation groove 316 of FIGS. 6A, 6B and 6C) recessed from the second surface 312b of the $(1-1)^{th}$ plate area 312 toward the first surface 312a.

According to an embodiment, the first protrusion member 317 may protrude from at least part of the accommodation groove 316. According to an embodiment, a pair of first protrusion members 317 may be provided, and each of the pair of first protrusion members 317 may protrude from one of sidewalls of the accommodation groove 316 facing each other toward the other sidewall in an opposite direction. According to an embodiment, the first protrusion member 317 may include a first portion 317a extending in the thickness direction of the first plate 311 and a second portion 317b extending from the first portion 317a in the sliding movement direction (e.g., an X-axis direction in FIG. 13) of the first plate 311. According to an embodiment, a pair of second portions 317b may be provided. According to an embodiment, the first portion 317a and the second portion 317b may form a fixing groove 318 having a groove shape. According to an embodiment, the fixing groove 318 may include a first fixing groove 318a and a second fixing groove 318b.

According to an embodiment, when the electronic device (e.g., the electronic device 101 of FIGS. 1 to 4) is opened, the first wing member (not shown) (e.g., the first wing member 344 of FIG. 9B) of the first guide wall (not shown) (e.g., the first guide wall 341 of FIG. 9B) may be inserted into the first fixing groove 318a, and the first portion 317a of the first protruding member 317 may press the first wing member (not shown) of the first guide wall (not shown). At this time, since the first wing member (not shown) is inserted into the first fixing groove 318a and surrounded by the first portion 317a and the second portions 317b, tilting of the first guide wall (not shown) may be restricted.

According to an embodiment, when the electronic device (e.g., the electronic device 101 of FIGS. 1 to 4) is closed, the second wing member (not shown) (e.g., the second wing member 349 of FIG. 12) of the second guide wall (not shown) (e.g., the first guide wall 346 of FIG. 12) may be inserted into the second fixing groove 318b, and the first portion 317a of the first protrusion member 317 may press the second wing member (not shown) of the second guide wall (not shown). At this time, since the second wing member (not shown) is inserted into the second fixing groove 318b and surrounded by the first portion 317a and the second portions 317b, tilting of the second guide wall (not shown) may be restricted.

Figure 14A:
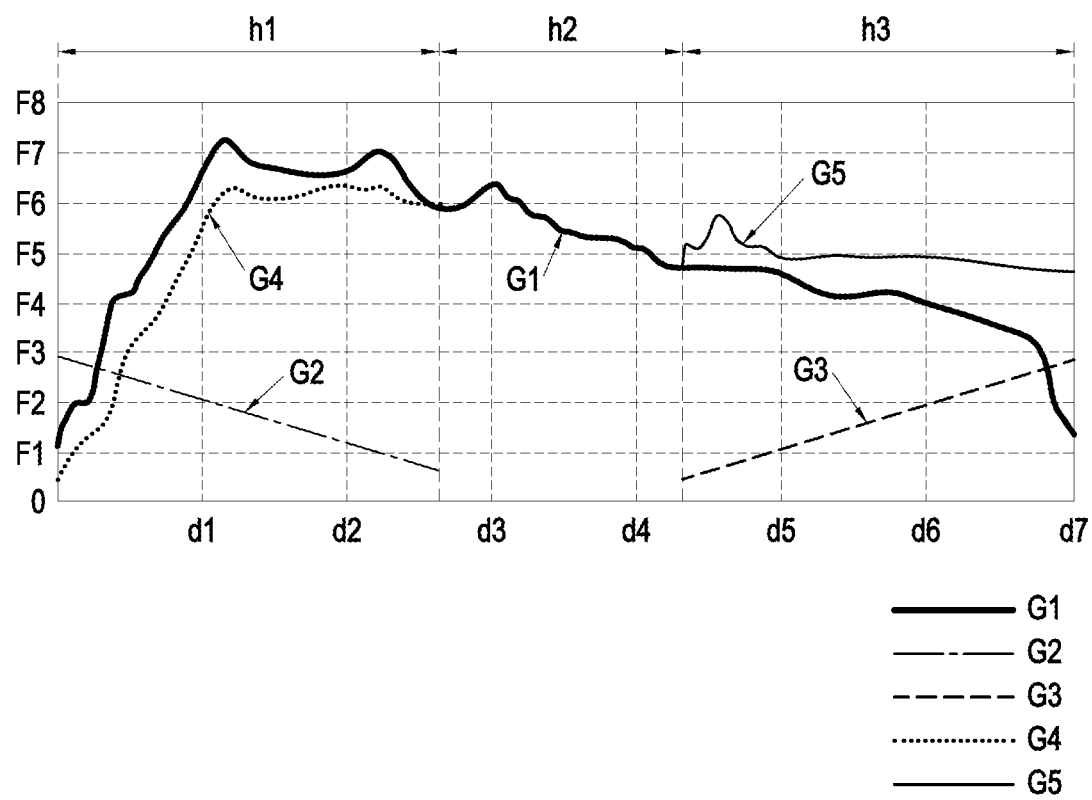
FIG. 14A is a graph illustrating a required driving force according to a sliding distance of a first plate, when an electronic device is opened according to various embodiments.
Figure 14B:
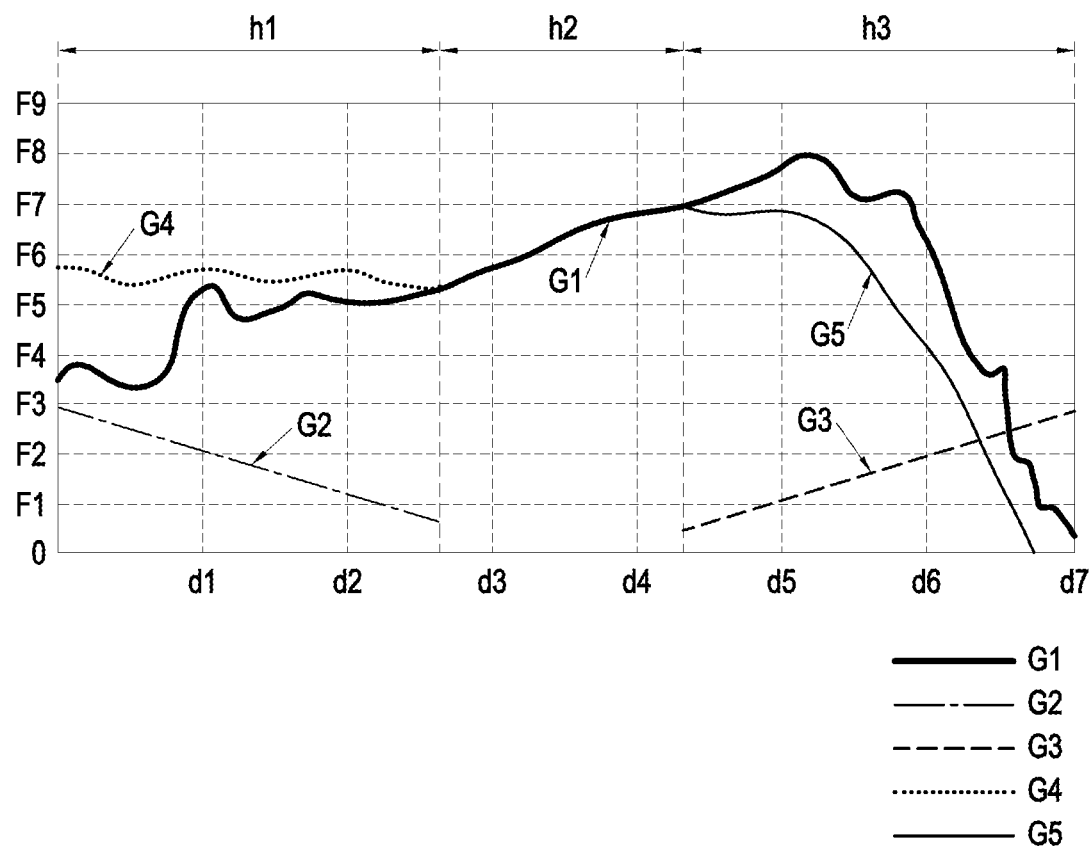
FIG. 14B is a graph illustrating a required driving force according to a sliding distance of a first plate, when an electronic device is closed according to various embodiments.

FIG. 14A is a graph illustrating required driving forces according to sliding distances of a first plate when an electronic device is opened according to various embodiments. FIG. 14B is a graph illustrating required driving forces according to sliding distances of a first plate when an electronic device is closed according to various embodiments.

With reference to FIGS. 11A, 11B and 14A, when the electronic device (e.g., the electronic device 101 of FIGS. 1 to 4) is opened, a required driving force of the driver for slidingly moving the first plate 311 (e.g., the driver 360 of FIGS. 5A and 5B) will be described.

A horizontal axis of FIG. 14A represents the movement distance of the first plate 311 in unit movement distances d1 to d7, and a vertical axis of FIG. 14A represents a required driving force for slidingly moving the first plate 311, an elastic restoring force of the first elastic member 331, or an elastic restoring force of the second elastic member 332 in unit forces F1 to F8 according to movement distances of the first plate 311. For example, a distance (e.g., a distance from d1 to d2) of one section among the unit movement distances may be about 3.2 mm to about 7.6 mm. For example, a force (e.g., a force from F1 to F2) of one section among the unit forces may be about 0.18 kgf to about 0.25 kgf.

"G1" of FIG. 14A may refer to a driving force of the driver for slidingly moving the first plate 311 according to a movement distance of the first plate 311 in an electronic device to which the first elastic member 331 and the second elastic member 332 are not applied.

"G2" of FIG. 14A may refer to an elastic restoring force that the second elastic member 332 acts on the second guide wall 346 according to a movement distance of the first plate 311.

"G3" of FIG. 14A may refer to an elastic restoring force that the first elastic member 331 acts on the first guide wall 341 according to a movement distance of the first plate 311.

"G4" of FIG. 14A may refer to a driving force of the driver for slidingly moving the first plate 311 according to a movement distance of the first plate 311 in an electronic device to which the second elastic member 332 is applied.

"G5" of FIG. 14A may refer to a driving force of the driver for slidingly moving the first plate 311 according to a movement distance of the first plate 311 in an electronic device to which the first elastic member 331 is applied.

The driving forces G1, G4, and G5 of the drivers in FIG. 14A may be driving forces required to slidingly moving the first plate 311, and a required driving force may refer to a minimum driving force having a greater value than a frictional force (e.g., a repulsive frictional force from the display or a frictional force from the second plate) acting on the first plate 311.

When the electronic device (e.g., the electronic device 101 of FIGS. 1 to 4) moves from the closed state (e.g., FIG. 2 or FIG. 11A) to the open state (e.g., FIG. 3 or FIG. 11B), the first plate 311 may move in the first movement direction (e.g., the +X direction in FIGS. 11A and 11B).

In the section of the $(1-1)^{th}$ slide length h1, the elastic restoring force of the second elastic member 332 and the driving force of the driver (not shown) may simultaneously act on the first plate 311.

In the case of the electronic device to which the second elastic member 332 is not applied, the driving force G1 of the driver may be required to slidingly move the first plate 311 in the section of the $(1-1)^{th}$ slide length h1.

In the case of the electronic device to which the second elastic member 332 according to various embodiments of the disclosure is applied, the elastic restoring force G2 of the second elastic member 332 may act on the first plate 311 in a direction for slidingly moving the first plate 311 in the section of the $(1-1)^{th}$ slide length h1, and accordingly, the driving force G4 of the driver may be required to slidingly move the first plate 311. The driving force G4 of the driver may be a driving force reduced from the driving force G1 of the driver by the elastic restoring force G2 of the second elastic member 332.

In the section of the $(1-2)^{th}$ slide length h2, the first plate 311 may slidingly move only by the driving force of the driver. In this case, the driving force of the driver for slidingly moving the first plate 311 may be equal to the driving force G1 of the driver.

In the section of the $(1-3)^{th}$ slide length h3, the elastic restoring force of the second elastic member 332 and the driving force of the driver (not shown) may simultaneously act on the first plate 311.

In the case of the electronic device to which the first elastic member 331 is not applied, the driving force G1 of the driver may be required to slidingly move the first plate 311 in the section of the $(1-3)^{th}$ slide length h3.

In the case of the electronic device to which the first elastic member 331 is applied according to various embodiments of the disclosure, the elastic restoring force G3 of the first elastic member 331 may act on the first plate 311 in the direction opposite to the direction in which the first plate 311 is to slidingly move, and accordingly, the driving force G5 may be required to slidingly move the first plate 311, in the section of the $(1-3)^{th}$ slide length h3. The driving force G5 of the driver may be a driving force increased from the driving force G1 of the driver by the elastic restoring force G3 of the first elastic member 331.

According to various embodiments of the disclosure, when the electronic device is opened (e.g., FIG. 3 or FIG. 11B), a driving force required to move the first plate 311 may have a maximum value in the section of the $(1-1)^{th}$ slide length h1. According to various embodiments of the disclosure, the electronic device may decrease the maximum value of the driving force required in the section of the $(1-1)^{th}$ slide length h1 through the elastic restoring force of the second elastic member 332 (G4). Accordingly, compared to the case without the second elastic member 332, the driver (e.g., the motor 361 of FIGS. 5A and 5B) may slidingly move the first plate 311 with a relatively low output, which enables miniaturization of the driver. In the electronic device according to various embodiments of the disclosure, a required maximum driving force of the driver may act in the section of the $(1\text{-}1)^{th}$ slide length h1, and thus, an extra driving force generated in the section of the $(1\text{-}3)^{th}$ slide length h3 may be used to compress the first elastic member 331.

With reference to FIGS. 11A, 11B and 14B, when the electronic device (e.g., the electronic device 101 of FIGS. 1 to 4) is closed, a required driving force of the driver (e.g., the driver 360 of FIGS. 5A and 5B) for slidingly moving the first plate 311 will be described below.

A horizontal axis of FIG. 14B represents the movement distance of the first plate 311 in unit movement distances d1 to d7, and a vertical axis of FIG. 14B represents a required driving force for slidingly moving the first plate 311, an elastic restoring force of the first elastic member 331, or an elastic restoring force of the second elastic member 332 in unit forces F1 to F8 according to movement distances of the first plate 311. For example, a distance (e.g., a distance from d1 to d2) of one section among the unit movement distances may be about 3.2 mm to about 7.6 mm. For example, a force (e.g., a force from F1 to F2) of one section among the unit forces may be about 0.18 kgf to about 0.25 kgf.

"G1" of FIG. 14B may refer to a driving force of the driver for slidingly moving the first plate 311 according to a movement distance of the first plate 311 in an electronic device to which the first elastic member 331 and the second elastic member 332 are not applied.

"G2" of FIG. 14B may refer to an elastic restoring force that the second elastic member 332 acts on the second guide wall 346 according to a movement distance of the first plate 311.

"G3" of FIG. 14B may refer to an elastic restoring force that the first elastic member 331 acts on the first guide wall 341 according to a movement distance of the first plate 311.

"G4" of FIG. 14B may refer to a driving force of the driver for slidingly moving the first plate 311 according to a movement distance of the first plate 311 in an electronic device to which the second elastic member 332 is applied.

"G5" of FIG. 14B may refer to a driving force of the driver for slidingly moving the first plate 311 according to a movement distance of the first plate 311 in an electronic device to which the first elastic member 331 is applied.

The driving forces G1, G4, and G5 of the drivers in FIG. 14B may be driving forces required to slidingly moving the first plate 311, and a required driving force may refer to a minimum driving force having a greater value than a frictional force (e.g., a repulsive frictional force from the display or a frictional force from the second plate) acting on the first plate 311.

When the electronic device (e.g., the electronic device 101 of FIGS. 1 to 4) moves from the open state (e.g., FIG. 3 or FIG. 11B) to the closed state (e.g., FIG. 2 or FIG. 11A), the first plate 311 may move in the second movement direction (e.g., the −X direction in FIGS. 11A and 11B).

In the section of the $(1\text{-}3)^{th}$ slide length h3, the elastic restoring force of the first elastic member 331 and the driving force of the driver (not shown) may simultaneously act on the first plate 311.

In the case of the electronic device to which the first elastic member 331 is not applied, the driving force G1 of the driver may be required to slidingly move the first plate 311 in the section of the $(1\text{-}3)^{th}$ slide length h3.

In the case of the electronic device to which the first elastic member 331 according to various embodiments of the disclosure is applied, the elastic restoring force G3 of the first elastic member 331 may act on the first plate 311 in a direction for slidingly moving the first plate 311 in the section of the $(1\text{-}3)^{th}$ slide length h3, and accordingly, the driving force G5 of the driver may be required to slidingly move the first plate 311. The driving force G5 of the driver may be a driving force reduced from the driving force G1 of the driver by the elastic restoring force G3 of the first elastic member 331.

In the section of the $(1\text{-}2)^{th}$ slide length h2, the first plate 311 may slidingly move only by the driving force of the driver. In this case, the driving force of the driver for slidingly moving the first plate 311 may be equal to the driving force G1 of the driver.

In the section of the $(1\text{-}1)^{th}$ slide length h1, the elastic restoring force of the second elastic member 332 and the driving force of the driver (not shown) may simultaneously act on the first plate 311.

In the case of the electronic device to which the second elastic member 332 is not applied, the driving force G1 of the driver may be required to slidingly move the first plate 311 in the section of the $(1\text{-}1)^{th}$ slide length h1.

In the case of the electronic device to which the second elastic member 332 is applied according to various embodiments of the disclosure, the elastic restoring force G3 of the second elastic member 332 may act on the first plate 311 in the direction opposite to the direction in which the first plate 311 is to slidingly move, and accordingly, the driving force G2 may be required to slidingly move the first plate 311, in the section of the $(1\text{-}1)^{th}$ slide length h1. The driving force G2 of the driver may be a driving force increased from the driving force G1 of the driver by the elastic restoring force G2 of the first elastic member 331.

According to various embodiments of the disclosure, when the electronic device is closed (e.g., FIG. 2 or FIG. 11A), a driving force required to move the first plate 311 may have a maximum value in the section of the $(1\text{-}3)^{th}$ slide length h3. According to various embodiments of the disclosure, the electronic device may decrease the maximum value of the driving force required in the section of the $(1\text{-}3)^{th}$ slide length h3 through the elastic restoring force of the first elastic member 331 (G5). Accordingly, compared to the case without the first elastic member 331, the driver (e.g., the motor 361 of FIGS. 5A and 5B) may slidingly move the first plate 311 with a relatively low output, which enables miniaturization of the driver. In the electronic device according to various embodiments of the disclosure, a required maximum driving force of the driver may act in the section of the $(1\text{-}3)^{th}$ slide length h3, and thus, an extra driving force generated in the section of the $(1\text{-}1)^{th}$ slide length h1 may be used to compress the second elastic member 331. The maximum driving force required for slidingly moving the first housing (or the first plate) when the electronic device is opened or closed may be generated in the $(1\text{-}3)^{th}$ slide length h3 when the electronic device is closed.

According to various example embodiments, an electronic device (e.g., the electronic device 101 of FIGS. 1 to 4) may include: a housing including a first housing (e.g., the first housing 201 of FIG. 4 or the first plate 311 of FIGS. 5A and 5B) and a second housing (e.g., the second housing 202 of FIG. 4 or the second plate 321 of FIGS. 5A and 5B) configured to guide sliding movement of the first housing; a display (e.g., the display 203 of FIG. 4) configured to be at least partially unfolded based on the sliding movement of the first housing, and including a first display area (e.g., the first display area A1 of FIG. 4) disposed on the first housing and a second display area (e.g., the second display area A2 of FIG. 4) extending from the first display area; a battery (e.g., the battery 289 of FIG. 4 or the battery 389 of FIG. 6A) disposed in the first housing; a driver (e.g., the driver 360 of FIGS. 5A and 5B) configured to provide a driving force for the sliding movement to the first housing, and including a motor (e.g., the motor 361 of FIGS. 5A and 5B) disposed in the first housing and a gear structure including a gear (e.g., the gear structure 362 of FIGS. 5A and 5B) at least partially disposed in the second housing and connected to the motor; and an elastic member (e.g., the elastic member 330 of FIGS. 5A and 5B) comprising a material arranged to be compressible and to provide an elastic restoring force disposed in the second housing. The gear structure may be disposed adjacent to one end of the battery, and the elastic member may be disposed adjacent to the other end of the battery facing a direction opposite to the one end of the battery. The gear may include pinion gear (e.g., the pinion gear 363 of FIGS. 5A and 5B), and a rack gear (e.g., the rack gear 364 of FIGS. 5A and 5B).

According to various example embodiments, the elastic member may include: a first elastic member (e.g., the first elastic member 331 of FIG. 7) configured to be elastically deformed by the first housing based on the first housing moving in a first movement direction; and a second elastic member (e.g., the second elastic member 332 of FIG. 7) configured to be elastically deformed by the first housing based on the first housing moving in a second movement direction opposite to the first movement direction.

According to various example embodiments, the first elastic member and the second elastic member may be disposed in a straight line.

According to various example embodiments, the first elastic member may be configured to provide an elastic restoring force to the first housing in the second movement direction based on the first housing moving in the second movement direction, and the second elastic member may be configured to provide an elastic restoring force to the first housing in the first movement direction with respect to the first housing moving in the first movement direction.

According to various example embodiments, the second housing (e.g., the second plate 321 of FIG. 7) may include a guide rail (e.g., the second guide rail 322 of FIG. 7) extending along a sliding movement direction of the first housing, and having the elastic member disposed therein, and the first housing (e.g., the first plate 311 of FIGS. 6A, 6B and 6C) may include an accommodation groove (e.g., the accommodation groove 316 of FIG. 6C) at least partially recessed and having the guide rail disposed therein.

According to various example embodiments, the electronic device may further include a guide wall (e.g., the guide wall 340 of FIG. 7) configured to slide on the guide rail based on being pressed by the sliding movement of the first housing.

According to various example embodiments, the elastic member may include: a first elastic member (e.g., the first elastic member 331 of FIG. 7) configured to be elastically deformed by the first housing based on the first housing moving in the first movement direction; and a second elastic member (e.g., the second elastic member 332 of FIG. 7) configured to be elastically deformed by the first housing based on the first housing moving in the second movement direction opposite to the first movement direction. The guide wall may include: a first guide wall (e.g., the first guide wall 341 of FIG. 7) coupled with the first elastic member; and a second guide wall (e.g., the second guide wall 346 of FIG. 7) coupled with the second elastic member.

According to various example embodiments, the guide rail may include a guide slit (e.g., the guide slit 324 of FIG. 8A) extending along the sliding movement direction of the first housing. The guide wall may include: a coupling portion (e.g., the first coupling member 342 of FIG. 9B) disposed inside the guide rail and coupled with the elastic member; a coupling groove (e.g., the first coupling groove 342a of FIG. 9B) recessed in at least part of the coupling portion and having the elastic member disposed therein; a connecting portion (e.g., the connecting member 343 of FIG. 9B) extending from the coupling portion and at least partially disposed in the guide slit; and a wing (e.g., the first wing member 344 of FIG. 9B) extending outside the connecting portion and configured to be pressed by at least part of the first housing based on the first housing moving.

According to various example embodiments, the first housing (e.g., the first plate 311 of FIGS. 6A, 6B and 6C) may include a first protrusion (e.g., the first protrusion member 315 of FIG. 6C or the first protrusion member 317 of FIG. 13) protruding from at least part of the accommodation groove and configured to press the wing.

According to various example embodiments, the first protrusion may be recessed in a shape corresponding to the wing, and include a fixing groove (e.g., the fixing groove 318 of FIG. 13) configured to fix the wing.

According to various example embodiments, the second housing (e.g., the second plate 321 of FIG. 12) may include a second protrusion (e.g., the second protrusion member 328 of FIG. 12) protruding from at least part of the guide slit and configured to provide a frictional force to the connecting portion.

According to various example embodiments, the first housing (e.g., the first housing 201 of FIG. 4) may include: a first plate (e.g., the first plate 211 of FIG. 4 or the first plate 311 of FIGS. 5A and 5B) configured to at least partially support the display by; and a first cover (e.g., the slide cover 212 of FIG. 4) coupled with the first plate and configured to cover at least part of the first display area. The first plate may include: a first first plate area (e.g., the $(1\text{-}1)^{th}$ plate area 312 of FIGS. 5A and 5B) configured to support at least part of the display; and a second first plate area (e.g., the $(1\text{-}2)^{th}$ plate area 313 of FIGS. 5A and 5B) extending from the first first plate area and having the motor disposed therein.

According to various example embodiments, the first first plate area may include a first surface (e.g., the first surface 312a of FIG. 6) and a second surface (e.g., the second surface 312b of FIG. 6B) facing a direction opposite to the first surface and configured to support the display, wherein the battery may be disposed on the first surface of the first first plate area.

According to various example embodiments, the second first plate area may include a first surface (e.g., the first area 313a of FIG. 6) and a second surface (e.g., the second surface 312b of FIG. 6B) facing a direction opposite to the first surface and configured to support the display, wherein the motor may be disposed on the first surface of the second first plate area.

According to various example embodiments, the gear structure may include a pinion gear (e.g., the pinion gear 363 of FIGS. 5A and 5B) connected to the motor, and a rack gear (e.g., the rack gear 364 of FIGS. 5A and 5B) connected to the pinion gear and disposed in the second housing. The first housing may include a bracket (e.g., the bracket 319 of FIGS. 6A and 6B) coupled with the second first plate area and configured to support the rack gear by at least part thereof.

According to various example embodiments of the disclosure, an electronic device (e.g., the electronic device 101 of FIGS. 1 to 4) may include: a housing including a first housing (e.g., the first housing 201 of FIG. 4 or the first plate 311 of FIGS. 5A and 5B) and a second housing (e.g., the second housing 202 of FIG. 4 or the second plate 321 of FIGS. 5A and 5B) configured to guide sliding movement of the first housing, wherein the first housing is configured to slidingly move in a first movement direction (e.g., the +X direction in FIGS. 5A and 5B) and a second movement direction (e.g., the −X direction in FIGS. 5A and 5B) opposite to the first movement direction, on the second housing; a display (e.g., the display 203 of FIG. 4) configured to be at least partially unfolded based on the sliding movement of the first housing, and including a first display area (e.g., the first display area A1 of FIG. 4) disposed on the first housing and a second display area (e.g., the second display area A2 of FIG. 4) extending from the first display area; a battery (e.g., the battery 289 of FIG. 4 or the battery 389 of FIG. 6A) disposed in at least one of the first housing or the second housing; a driver (e.g., the driver 360 of FIGS. 5A and 5B) configured to provide a driving force for the sliding movement to the first housing, and including a motor (e.g., the motor 361 of FIGS. 5A and 5B) disposed in the first housing and a gear structure including a gear (e.g., the gear structure 362 of FIGS. 5A and 5B) at least partially disposed in the second housing and connected to the motor; and a first elastic member (e.g., the first elastic member 311 of FIG. 7) comprising a material arranged to be compressible and to provide an elastic restoring force disposed in the second housing (e.g., the second plate 321 of FIG. 7), and configured to be elastically deformed by the first housing based on the first housing moving in the first movement direction, and to provide an elastic restoring force to the first housing in the second movement direction based on the first housing moving in the second movement direction. The gear structure may be disposed adjacent to one end of the battery, and the first elastic member may be disposed adjacent to the other end of the battery facing a direction opposite to the one end of the battery. The gear may include pinion gear (e.g., the pinion gear 363 of FIGS. 5A and 5B), and a rack gear (e.g., the rack gear 364 of FIGS. 5A and 5B).

According to various example embodiments, the electronic device may further include a second elastic member (e.g., the second elastic member 332 of FIG. 7) disposed in the second housing (e.g., the second plate 321 of FIG. 7), and configured to be elastically deformed by the first housing based on the first housing sliding in the second movement direction, and provide an elastic restoring force to the first housing in the first movement direction with respect to the first housing moving in the first movement direction.

According to various example embodiments, the first housing may include: a first plate (e.g., the first plate 211 of FIG. 4 or the first plate 311 of FIGS. 5A and 5B) configured to at least partially support the display, and a first cover (e.g., the slide cover 212 of FIG. 4) coupled with the first plate and configured to cover at least part of the first display area. The second housing may include: a second plate (e.g., the second plate 221 of FIG. 4 or the second plate 321 of FIGS. 5A and 5B) configured to at least partially support the display, and coupled with the first plate to enable the first plate to slidingly move; and a second cover (e.g., the book cover 222 of FIG. 4) coupled with the second plate. The first elastic member may be disposed in a portion facing the second cover in the second plate.

According to various example embodiments, at least part of the gear structure may be disposed in the portion facing the second cover in the second plate.

According to various example embodiments of the disclosure, an electronic device (e.g., the electronic device of FIGS. 1 to 4) may include: a first housing (e.g., the first housing 201 of FIG. 4 or the first plate 311 of FIGS. 5A to 6C) including a first side surface (e.g., the first side surface 311a of FIGS. 6A and 6B) facing a first direction (e.g., the −Y direction in FIGS. 6A and 6B) and a second side surface (e.g., the second side surface 311b of FIGS. 6A and 6B) facing a second direction (e.g., the +Y direction in FIGS. 6A and 6B) opposite to the first side surface; a second housing (e.g., the second housing 202 of FIG. 4 or the second plate 321 of FIGS. 5A to 6C) configured to guide sliding movement of the first housing; a display (e.g., the display 203 of FIG. 4) configured to be at least partially unfolded based on the sliding movement of the first housing, and including a first display area (e.g., the first display area A1 of FIG. 4) disposed on the first housing and a second display area (e.g., the second display area A2 of FIG. 4) extending from the first display area; a driver (e.g., the driver 360 of FIGS. 5A and 5B) configured to provide a driving force for the sliding movement to the first housing, and including a motor (e.g., the motor 361 of FIGS. 5A and 5B) disposed in one of the first housing and the second housing, a pinion gear (e.g., the pinion gear 363 of FIGS. 5A and 5B) connected to the motor, and a rack gear (e.g., the rack gear 364 of FIGS. 5A and 5B) disposed in the other of the first housing and the second housing and connected to the pinion gear; and an elastic member (e.g., the elastic member 330 of FIGS. 5A and 5B) comprising a material arranged to be compressible and to provide an elastic restoring force disposed on at least one of the first housing or the second housing. The rack gear may be disposed between the first side surface of the first housing and the second side surface of the first housing, and closer to the first side surface between the first side surface and the second side surface, and the elastic member may be disposed between the rack gear and the second side surface.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a housing including a first housing and a second housing configured to guide sliding movement of the first housing, while the housing is being opened and closed;
   a flexible display including a first display area and a second display area extending from the first display area;
   a battery;
   a motor configured to provide a driving force for the sliding movement of the first housing in a first movement direction and a second movement direction;
   a gear structure including a pinion gear connected to the motor and a rack gear engaged with the pinion gear, the pinion gear configured to be rotated by the driving force from the motor, wherein the pinion gear and/or the motor slidably move on the rack gear in the first movement direction and the second movement direction; and an elastic member comprising a material arranged to be compressible and configured to be deformed based on the sliding movement of the first housing, wherein the elastic member is configured to provide an elastic restoring force as a force for the sliding movement of the first housing in the first movement direction and the second movement direction to reduce the driving force of the motor required while the housing is being opened and closed, wherein the gear structure is disposed adjacent to one end of the battery, and wherein the elastic member is disposed adjacent to the other end of the battery facing a direction opposite to the one end of the battery.

2. The electronic device of claim 1, wherein the elastic member includes:
  a first elastic member configured to be elastically deformed by the first housing based on the first housing moving in the first movement direction; and
  a second elastic member configured to be elastically deformed by the first housing based on the first housing moving in the second movement direction opposite to the first movement direction.

3. The electronic device of claim 2, wherein the first elastic member and the second elastic member are disposed in a straight line.

4. The electronic device of claim 2, wherein the first elastic member is configured to provide an elastic restoring force to the first housing in the second movement direction based on the first housing moving in the second movement direction, and
  wherein the second elastic member is configured to provide an elastic restoring force to the first housing in the first movement direction with respect to the first housing moving in the first movement direction.

5. The electronic device of claim 1, wherein the second housing includes a guide rail extending along a sliding movement direction of the first housing, and having the elastic member disposed therein, and
  wherein the first housing includes an accommodation groove at least partially recessed and having the guide rail disposed therein.

6. The electronic device of claim 5, further comprising a guide wall configured to slide on the guide rail by being pressed by the sliding movement of the first housing.

7. The electronic device of claim 6, wherein the elastic member includes:
  a first elastic member configured to be elastically deformed by the first housing based on the first housing moving in the first movement direction; and
  a second elastic member configured to be elastically deformed by the first housing based on the first housing moving in the second movement direction opposite to the first movement direction, and
  wherein the guide wall includes:
  a first guide wall coupled with the first elastic member; and
  a second guide wall coupled with the second elastic member.

8. The electronic device of claim 6, wherein the guide rail includes a guide slit extending along the sliding movement direction of the first housing, and wherein the guide wall includes:
  a coupling portion disposed inside the guide rail and coupled with the elastic member;
  a coupling groove recessed in at least part of the coupling portion and having the elastic member disposed therein;
  a connecting portion extending from the coupling portion and at least partially disposed in the guide slit; and
  a wing extending outside the connecting portion and configured to be pressed by at least part of the first housing based on the first housing moving.

9. The electronic device of claim 8, wherein the first housing includes a first protrusion protruding from at least part of the accommodation groove and configured to press the wing.

10. The electronic device of claim 9, wherein the first protrusion is recessed in a shape corresponding to the wing, and includes a fixing groove configured to fix the wing.

11. The electronic device of claim 8, wherein the second housing includes a second protrusion protruding from at least part of the guide slit and configured to provide a frictional force to the connecting portion.

12. The electronic device of claim 1, wherein the first housing includes:
  a first plate configured to at least partially support the display; and
  a first cover coupled with the first plate and configured to cover at least part of the first display area, and
  wherein the first plate includes:
  a first first plate area configured to support at least part of the display; and
  a second first plate area extending from the first first plate area and having the motor disposed therein.

13. The electronic device of claim 12, wherein the first first plate area includes a first surface and a second surface facing a direction opposite to the first surface and configured to support the display, and
  wherein the battery is disposed on the first surface of the first first plate area.

14. The electronic device of claim 13, wherein the second first plate area includes a first surface and a second surface facing a direction opposite to the first surface and configured to support the display, and
  wherein the motor is disposed on the first surface of the second first plate area.

15. The electronic device of claim 13, wherein the gear structure includes a pinion gear connected to the motor, and a rack gear connected to the pinion gear and disposed in the second housing, and
  wherein the first housing includes a bracket coupled with the second first plate area and configured to support the rack gear by at least part thereof.

16. An electronic device comprising:
  a housing including a first housing and a second housing configured to guide sliding movement of the first housing while the housing is being opened and closed, wherein the first housing is configured to slidingly move in a first movement direction and a second movement direction opposite to the first movement direction, on the second housing;
  a flexible display including a first display area and a second display area extending from the first display area;
  a battery disposed in at least one of the first housing or the second housing;

a motor disposed in the first housing and configured to provide a driving force for the sliding movement of the first housing in a first movement direction and a second movement direction;

a gear structure including a pinion gear connected to the motor and a rack gear disposed in the second housing and engaged with the pinion gear, the pinion gear configured to be rotated by the driving force from the motor, wherein the pinion gear and/or the motor slidably move on the rack gear in the first movement direction and a second movement direction; and an elastic member disposed in the second housing and comprising a material arranged to be compressible, wherein the elastic member is configured to provide an elastic restoring force as a force for the sliding movement of first housing in the first movement direction and the second movement direction to reduce the driving force of the motor required while the housing is being opened and closed, and configured to be elastically deformed by the first housing based on the slide movement of the first housing, wherein, when the housing is closed, the gear structure is disposed adjacent to one end of the battery, and wherein, when the housing is closed, the elastic member is disposed adjacent to the other end of the battery facing a direction opposite to the one end of the battery.

17. The electronic device of claim 16, wherein the elastic member comprises a first elastic member disposed in the second housing, and configured to be elastically deformed by the first housing based on the first housing moving in the first movement direction, and to provide an elastic restoring force to the first housing in the second movement direction with respect to the first housing moving in the second movement direction, the electronic device further comprising a second elastic member disposed in the second housing, and configured to be elastically deformed by the first housing based on the first housing moving in the second movement direction, and to provide an elastic restoring force to the first housing in the first movement direction with respect to the first housing moving in the first movement direction.

18. The electronic device of claim 16, wherein the first housing includes:
a first plate configured to at least partially support the display; and
a first cover coupled with the first plate and configured to cover at least part of the first display area,
wherein the second housing includes:
a second plate configured to at least partially support the display, and coupled with the first plate to enable the first plate to slidingly move; and
a second cover coupled with the second plate, and
wherein the elastic member is disposed in a portion facing the second cover in the second plate.

19. The electronic device of claim 18, wherein at least part of the gear structure is disposed in the portion facing the second cover in the second plate.

20. An electronic device comprising:
a first housing including a first side surface facing a first direction and a second side surface facing a second direction opposite to the first side surface;
a second housing configured to guide sliding movement of the first housing;
a flexible display configured to be at least partially unfolded based on the sliding movement of the first housing, and including a first display area disposed on the first housing and a second display extending from the first display area;
a motor configured to provide a driving force for the sliding movement of the first housing in a first movement direction and a second movement direction, and disposed in one of the first housing and the second housing, a pinion gear connected to the motor, and a rack gear disposed in the other of the first housing and the second housing and connected to the pinion gear, the pinion gear configured to be rotated by the driving force from the motor, wherein the pinion gear and/or the motor slidably move on the rack gear in the first movement direction and the second movement direction; and
an elastic member comprising a material arranged to be compressible,
wherein the elastic member is configured to provide an elastic restoring force as a force for the sliding movement of the first housing in the first movement direction and the second movement direction to reduce the driving force of the motor required while the housing is being opened and closed,
wherein the rack gear is disposed between the first side surface of the first housing and the second side surface of the first housing, and closer to the first side surface between the first side surface and the second side surface, and
wherein the elastic member is disposed between the rack gear and the second side surface.

\* \* \* \* \*